(12) United States Patent
Allen et al.

(10) Patent No.: US 11,250,341 B2
(45) Date of Patent: Feb. 15, 2022

(54) SYSTEM, METHOD AND COMPUTER READABLE MEDIUM FOR QUASSICAL COMPUTING

(71) Applicant: LOCKHEED MARTIN CORPORATION, Bethesda, MD (US)

(72) Inventors: Edward H. Allen, Bethesda, MD (US); Luke A. Uribarri, Arlington, VA (US); Kristen L. Pudenz, Longmont, CO (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 813 days.

(21) Appl. No.: 16/124,864

(22) Filed: Sep. 7, 2018

(65) Prior Publication Data
US 2019/0080255 A1   Mar. 14, 2019

Related U.S. Application Data

(60) Provisional application No. 62/555,396, filed on Sep. 7, 2017.

(51) Int. Cl.
*G06N 10/00* (2019.01)
*G06N 20/00* (2019.01)

(52) U.S. Cl.
CPC .............. *G06N 10/00* (2019.01); *G06N 20/00* (2019.01)

(58) Field of Classification Search
CPC ....... G06N 10/00; G06N 20/00; G06N 99/002
See application file for complete search history.

(56) References Cited

U.S. PATENT DOCUMENTS

| | | | |
|---|---|---|---|
| 7,266,303 B2 | 9/2007 | Linden et al. | |
| 8,190,553 B2 | 5/2012 | Routt | |
| 8,832,164 B2 | 9/2014 | Allen et al. | |
| 8,849,580 B2 | 9/2014 | Kauffman et al. | |

(Continued)

OTHER PUBLICATIONS

Allen et al., "Quassical Computing," Aug. 15, 2018, https://arxiv.org/pdf/1805.03306v2.pdf.

(Continued)

*Primary Examiner* — Dave Misir
(74) *Attorney, Agent, or Firm* — Terry M. Sanks, Esquire; Beusse Sanks, PLLC

(57) ABSTRACT

A system comprising a classical computing subsystem to perform classical operations in a three-dimensional (3D) classical space unit using decomposed stopping points along a consecutive sequence of stopping points of sub-cells, along a vector with a shortest path between two points of the 3D classical space unit. The system includes a quantum computing subsystem to perform quantum operations in a 3D quantum space unit using decomposed stopping points along a consecutive sequence of stopping points of sub-cells, along a vector selected to have a shortest path between two points of the 3D quantum space unit. The system includes a control subsystem to decompose classical subproblems and quantum subproblems into the decomposed points and provide computing instructions and state information to the classical computing subsystem to perform the classical operations to the quantum computing subsystem to perform the quantum operations. A method and computer readable medium are provided.

20 Claims, 18 Drawing Sheets

(56) References Cited

U.S. PATENT DOCUMENTS

| | | | |
|---|---|---|---|
| 9,369,133 B2 | 6/2016 | Naaman et al. | |
| 10,127,499 B1* | 11/2018 | Rigetti | G06N 10/00 |
| 2008/0313430 A1* | 12/2008 | Bunyk | B82Y 10/00 |
| | | | 712/34 |
| 2009/0070402 A1* | 3/2009 | Rose | B82Y 10/00 |
| | | | 709/201 |
| 2009/0164435 A1* | 6/2009 | Routt | B82Y 10/00 |
| 2012/0254586 A1* | 10/2012 | Amin | G06N 10/00 |
| | | | 712/29 |
| 2017/0177534 A1 | 6/2017 | Mohseni et al. | |
| 2017/0357539 A1* | 12/2017 | Dadashikelayeh | G06F 16/25 |
| 2018/0091440 A1 | 3/2018 | Dadashikelayeh et al. | |
| 2018/0260245 A1 | 9/2018 | Smith | |

OTHER PUBLICATIONS

Narimani et al., "Combinatorial Optimization by Decomposition on Hybrid CPU-non-CPU Solver Architectures," Sep. 16, 2017, https://arxiv.org/pdf/1708.03439v3.pdf.

Australian Examination Report, dated Apr. 9, 2020.

Calude et al., "The Road to Quantum Computational Supremacy," arXiv:1712.01356v1 [quant-ph], Dec. 4, 2017.

Stern et al., "Flux Qubits with Long Coherence Times for Hybrid Quantum Circuits," arXiv:1403.3871v2 [cond-mat.mes-hall] Jul. 4, 2014.

Tamir et al., "Notes on Adiabatic Quantum Computers," arXiv:1512.07617v2 [quant-ph] Mar. 21, 2016.

Miller et al., "Quantum supremacy in constant-time measurement-based computation: A unified architecture for sampling and verification," arXiv:1703.11002v2 [quant-ph] Dec. 29, 2017.

Puri et al., "Quantum annealing with all-to-all connected nonlinear oscillators," Nature Communications | 8:15785 | DOI: 10.1038/ncomms15785 |www.nature.com/naturecommunications, Jun. 8, 2017.

Nielsen, Michael, "The Solovay-Kitaev algorithm," May 7, 2005.

Albash et al., "Decoherence in adiabatic quantum computation," arXiv:1503.08767v2 [quant-ph] Jun. 19, 2015.

Adachi et al., "Application of Quantum Annealing to Training of Deep Neural Networks," Lockheed Martin Corporation, 2015.

Jozsa, Richard, "An introduction to measurement based quantum computation," arXiv:quant-ph/0508124v2 Sep. 20, 2005.

Aharonov et al., "Adiabatic Quantum Computation is Equivalent to Standard Quantum Computation," arXiv:quant-ph/0405098v2 Mar. 26, 2005.

Landauer, R., "Irreversibility and Heat Generation in the Computing Process," IBM Journal, Jul. 1961.

Bennett, C.H., "Logical Reversibility of Computation," IBM Journal of Research and Development 17:525-532, Nov. 1973).

Frank, Michael, P., "Back to the Future: The Case for Reversible Computing," Version 5.7 (ArXiv Preprint v2), arXiv:1803.02789 [cs.ET], Mar. 7, 2018.

Lutchyn, Roman, "Topological quantum computing with Majorana Fermions," Sep. 22, 2011.

Allen, Edward H., "Negative Probabilities and the Uses of Signed Probability Theory," downloaded from 119.017.034.130 on Feb. 26, 2017 23:18:49 PM, http://www.journals.uchicago.edu/t-and-c.

Harrow, et al., "Quantum algorithm for linear systems of equations," arXiv:0811.3171v3 [quant-ph] Sep. 30, 2009.

Berry, Dominic W., "High-order quantum algorithm for solving linear differential equations," arXiv:1010.2745v2 [quant-ph] Jan. 28, 2014.

Lloyd et al., "Quantum algorithms for supervised and unsupervised machine learning," arXiv:1307.0411v2 [quant-ph] Nov. 4, 2013.

Rebentrost et al., "Quantum support vector machine for big feature and big data classification," arXiv:1307.0471v2 [quant-ph] Jul. 10, 2013.

Montanaro, Ashley, "Quantum algorithms: an overview," npj Quantum Information (2016) 2, 15023; doi:10.1038/hpjqi.2015.23; published online Jan. 12, 2016.

Barz et al., A two-qubit photonic quantum processor and its application to solving systems of linear equations, Scientific Reports | 4 : 6115 | DOI: 10.1038/srep06115, Aug. 19, 2014.

http://physics.aps.org/synopsis-for/10.1103/PhysRevLett.110. 230501 Stonebraker, Alan, "A calculation performed with four photon qubits proves that a promising quantum algorithm works," Synopsis: Solving for X and Y, http://physics.aps.org/synopsis-for/10.1103/PhysRevLett.110.230501, Jun. 6, 2013.

Preskill, J., Chapter 1, "Introduction and Overview," p. 1-30, www.theory.caltech.edu/people/preskill/ph229, 1997-1998.

* cited by examiner

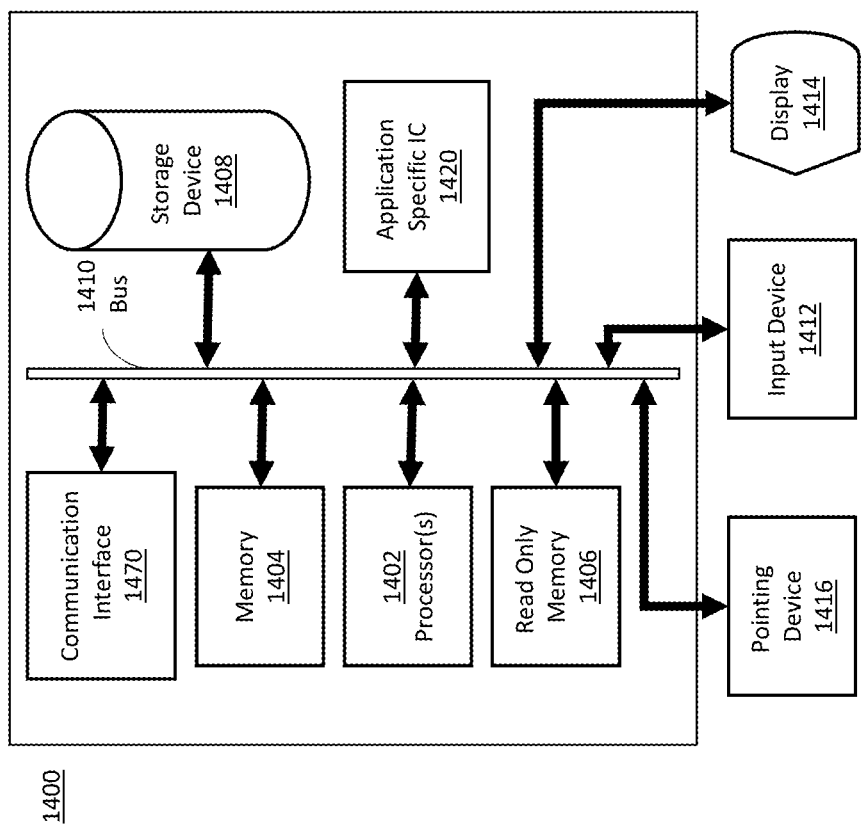

SYSTEM, METHOD AND COMPUTER READABLE MEDIUM FOR QUASSICAL COMPUTING

CROSS-REFERENCE TO RELATED APPLICATIONS

This application claims the benefit of U.S. Provisional Application No. 62/555,396, entitled "SYSTEM AND METHOD FOR QUASSICAL COMPUTING," filed Sep. 7, 2017, and incorporated herein by reference in its entirety.

BACKGROUND

Embodiments relate to systems methods and computer readable medium for quassical computing.

Quantum computers are thought to be superior in some ways to classical computers. However, this may hold true only for some problems, though those problems may be important. These problems relate to and include some so-called "NP-hard problems" (having no known polynomial algorithm) among others. Using "quantum speedup," quantum computers can reach a solution faster than a classical computer. A subtler advantage can be appreciated when the details of quantum process are not understood well-enough to be simulated computationally with calculations on a classical machine. Instead, these details can be "simulated" or "emulated" with another, better understood quantum process—a system of quantum bits (or "qubits") used as an analog simulator rather than a calculator of sums or numbers. Quantum computers, however, suffer from two serious faults: 1) short coherence times and 2) physical limitations to the topological feasibility of complete and controllable internal connectivity. While quantum computers are thought to be superior to classical computers, quantum computers are error prone as a computational path length approaches a decoherence limit. For example, a "depth of a circuit" in quantum space may be require 100 milliseconds of coherent operation before a decoherence time limit is reached. Staying in the quantum space longer than a decoherence time limit causes the probability of corrupt quantum data to increase. It is not uncommon for an error correction schemes to require 1000 qubits of overhead to correct one (1) qubit in error. Such error correction schemes to extend the length of operation in the quantum space increases the number of qubits dramatically.

SUMMARY

Embodiments relate to systems, methods and computer readable medium for quassical computing. An aspect of the embodiments includes a system comprising a classical computing subsystem configured to perform a set of classical operations in a configurable three-dimensional (3D) classical space unit using one or more of classical computing gates arranged in decomposed stopping points along a consecutive sequence of stopping points of sub-cells of the classical space unit, along a classical trajectory vector selected to have a shortest path through the 3D classical space unit between two points of the 3D classical space unit. The system includes a quantum computing subsystem configured to perform a set of quantum operations in a configurable 3D quantum space unit using one or more of quantum computing gates arranged in decomposed stopping points along a consecutive sequence of stopping points of sub-cells of the 3D quantum space unit, along a quantum trajectory vector selected to have a shortest path through the 3D quantum space unit between two points of the 3D quantum space unit. The system includes a control subsystem configured to receive a problem decomposed into classical subproblems and quantum subproblems, decompose the received classical subproblems into the decomposed stopping points in the 3D classical space unit and the received quantum subproblems into the decomposed stopping points in the 3D quantum space unit, provide classical computing instructions and state information to the classical computing subsystem to perform the set of classical operations and provide quantum computing instructions and state information to the quantum computing subsystem to perform the set of quantum operations.

Another aspect of the embodiments include a method comprising performing, by a classical computing subsystem, a set of classical operations in a configurable three-dimensional (3D) classical space unit using one or more of classical computing gates arranged in decomposed stopping points along a consecutive sequence of stopping points of sub-cells of the classical space unit, along a classical trajectory vector selected to have a shortest path through the 3D classical space unit between two points of the 3D classical space unit. The method includes performing, by a quantum computing subsystem, a set of quantum operations in a configurable 3D quantum space unit using one or more of quantum computing gates arranged in decomposed stopping points along a consecutive sequence of stopping points of sub-cells of the 3D quantum space unit, along a quantum trajectory vector selected to have a shortest path through the 3D quantum space unit between two points of the 3D quantum space unit; receiving, by a control subsystem, a problem decomposed into classical subproblems and quantum subproblems; decomposing, by the control subsystem, the received classical subproblems into the decomposed stopping points in the 3D classical space unit and the received quantum subproblems into the decomposed stopping points in the 3D quantum space unit; and providing, by the control subsystem, classical computing instructions and state information to the classical computing subsystem to perform the set of classical operations and quantum computing instructions and the state information to the quantum computing subsystem to perform the set of quantum operations.

Another aspect of the embodiments includes non-transitory, tangible computer readable media having instructions stored therein which when executed by at least one processor, causes the at least one processor to: perform, by a classical computing subsystem, a set of classical operations in a configurable three-dimensional (3D) classical space unit using one or more of classical computing gates arranged in decomposed stopping points along a consecutive sequence of stopping points of sub-cells of the classical space unit, along a classical trajectory vector selected to have a shortest path through the 3D classical space unit between two points of the 3D classical space unit; perform, by a quantum computing subsystem, a set of quantum operations in a configurable 3D quantum space unit using one or more of quantum computing gates arranged in decomposed stopping points along a consecutive sequence of stopping points of sub-cells of the 3D quantum space unit, along a quantum trajectory vector selected to have a shortest path through the 3D quantum space unit between two points of the 3D quantum space unit; receive, by a control subsystem, a problem decomposed into classical subproblems and quantum subproblems; decompose, by the control subsystem, the received classical subproblems into the decomposed stopping points in the 3D classical space unit and the received quantum subproblems into the decomposed stopping points in the 3D quantum space unit; and provide, by the control subsystem, classical computing instructions and state information to the classical computing subsystem to perform the set of classical operations and quantum computing instructions and the state information to the quantum computing subsystem to perform the set of quantum operations.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 14 illustrates a basic configuration of a classical computing subsystem.

DETAILED DESCRIPTION

Figure 1:
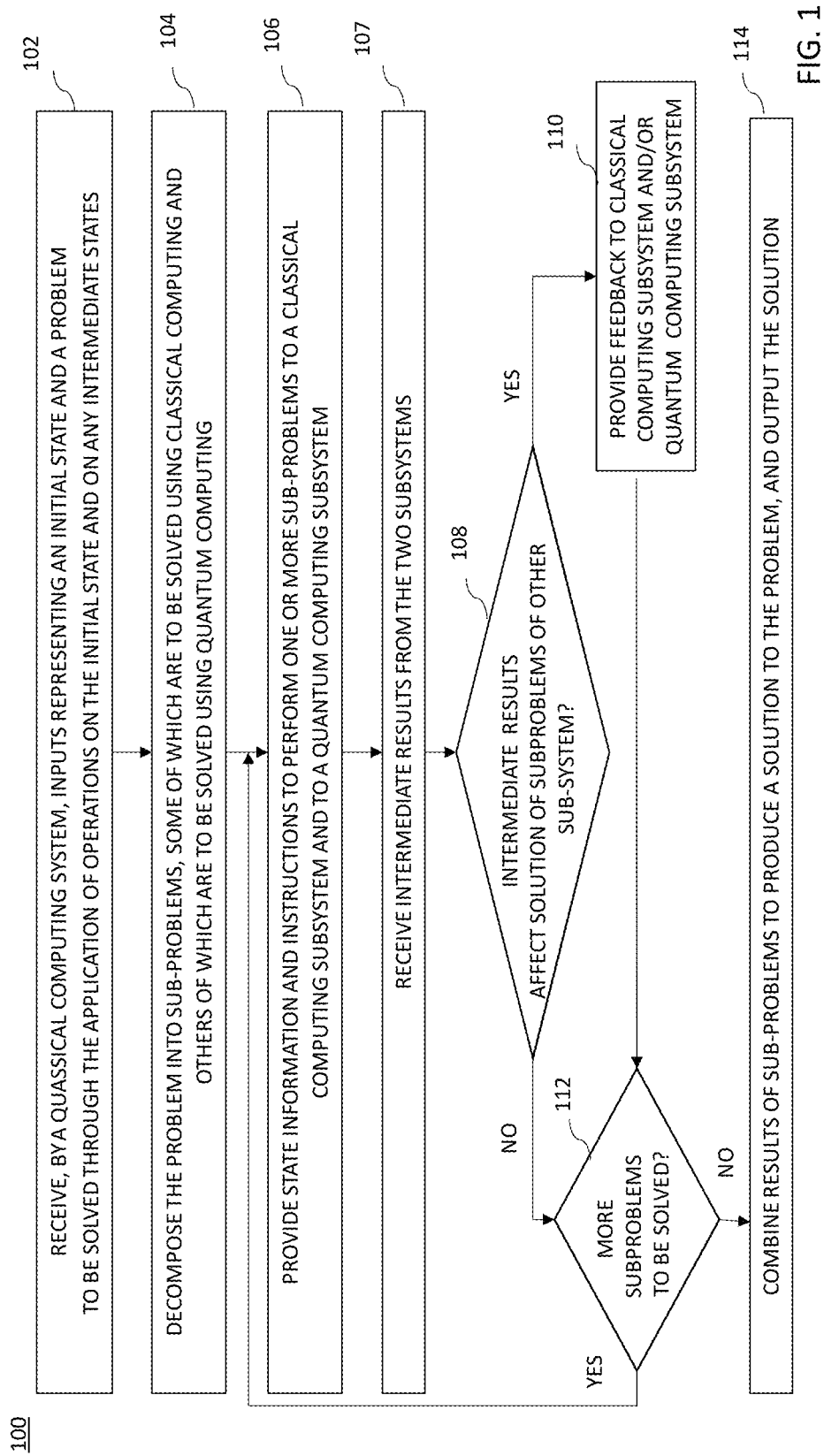
FIG. 1 illustrates a flow diagram of an example method for performing quassical computing in accordance with an embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 is a flow diagram of an example method 100 for performing quassical computing in accordance with the disclosed subject matter. In some embodiments, one or more blocks of the method 100 may be implemented through the execution of program instructions by a processor in a quassical computing system. In other embodiments, method 100 may be implemented using hardware circuitry in a quassical computing system. In still other embodiments, method 100 may be implemented using any suitable combination of program instructions and hardware circuitry in a quassical computing system.

In this example embodiment, method 100 includes, at block 102, receiving, by a quassical computing system, inputs representing an initial state and a problem to be solved through the application of operations on the initial state and on any intermediate states. Method 100 may also include, at block 104, decomposing the problem into multiple sub-problems. Some sub-problems may be performed using classical computing and others may be performed using quantum computing. Method 100 may include, at block 106, providing state information and instructions to perform one or more respective sub-problems to each of a classical computing subsystem and to a quantum computing subsystem of the quassical computing system and, at block 107, receiving intermediate results from the classical computing subsystem and the quantum computing subsystem.

If, at block 108, it is determined that the intermediate results received by the control subsystem from one of the classical computing and quantum computing subsystems affect the solution of one or more sub-problems by the other subsystem, then at block 110, method 100 may include providing feedback to the classical computing subsystem and/or to the quantum computing subsystem based on those intermediate results of the other subsystem. Block 110 of method 100 may flow to block 112 wherein the feedback may be useful for the operation of a subsequent sub-problem. For example, an intermediate result of a first sub-problem received from one of the subsystems, or a portion thereof, may serve as an input to the other subsystem for solving a second sub-problem. Otherwise, method 100 may proceed to block 112. If, at block 112, additional sub-problems need to be solved, one or more operations of method 100 may be repeated, as appropriate, beginning again at block 106. Otherwise, method 100 may proceed to block 114. At block 114, method 100 may include assembling or combining the results of the multiple sub-problems to produce a solution to the problem and outputting the solution to the problem.

A quassical computing system, which includes a classical computing subsystem and a quantum computing subsystem, may take many different forms, depending on the configuration, e.g., a configuration that supports trivial quassicality, a configuration that supports fundamental or profound quassicality, or a configuration that falls along a spectrum between trivial quassicality and profound quassicality. At the system level, the qubits provided by the quantum computing subsystem may be mathematically equivalent, but the particular configuration may determine how the qubits are connected to the classical computing subsystem for mutual advantage, as will be described in more detail in FIGS. 12A-12C. In at least some embodiments, inputs coming into the quassical computing system define an initial (or intermediate) state and a problem to be solved. Depending on how the problem is decomposed into quantum and classical sub-problems, some of the inputs may be provided to the classical computing subsystem, while others may be provided to the quantum computing subsystem. Outputs from the classical and quantum computing subsystems may then then be combined in some way to generate quassical computing system outputs.

In some embodiments, there may be feedback between the classical and quantum computing subsystems at certain points in the process. The use and the type of any such feedback may be dependent on the category of quassicality being implemented by the overall system in solving the problem. The interfaces between the classical and quantum computing subsystems (e.g., their measurement capabilities) may depend on the configuration (and/or quassicality) of the overall system and the qubit type or, more generally, the quantum computing subsystem type. As described above in reference to method 100 illustrated in FIG. 1, the inputs provided to the quassical computing system may include state information, the type of gate operation(s) or circuits to be applied, and how the results are to be measured. The decomposition of the problem into quantum and classical sub-problems may be performed by the classical computing subsystem (e.g., by an operating system or other system-level software), a separate control subsystem of the quassical computing system, or by another component internal or external to the quassical computing system, in various embodiments.

Figure 2:
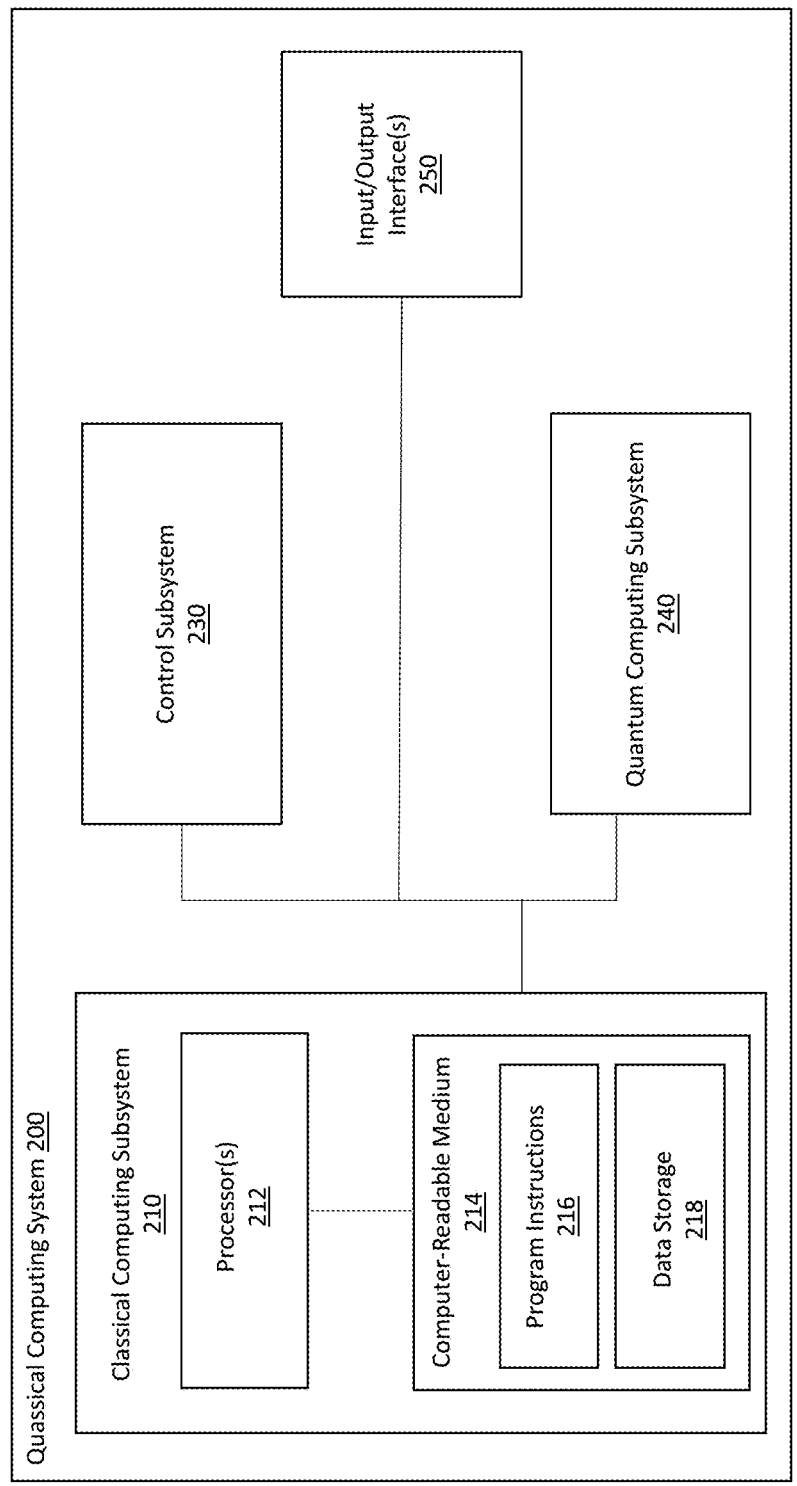
FIG. 2 illustrates a block diagram of a quassical computing system in accordance with an embodiment.

FIG. 2 is a diagram illustrating an example quassical computing system 200 in accordance with the disclosed subject matter. In this example embodiment, quassical computing system 200 includes one or more input/output interfaces 250, classical computing subsystem 210, quantum computing subsystem 240, and control subsystem 230. Classical computing subsystem 210 includes one or more processors 212 and computer-readable media 214, including program instructions 216 and data storage 218. An example of a classical computing subsystem is shown and described in relation to FIG. 14. Classical computing subsystem 210 and quantum computing subsystem 240 may each be configured to solve respective subsets of the sub-problems into which a problem presented to quassical computing system 200 is decomposed. In certain embodiments, program instructions 216, when executed by processors 212, may be configured to solve one subset of the sub-problems into which the problem is decomposed.

Control subsystem 230 may be configured to receive and/or analyze inputs provided to quassical computing system 200 for a given problem, to decompose the problem into multiple sub-problems, to provide state information and instructions to classical computing subsystem 210 and quantum computing subsystem 240 to solve respective subsets of those sub-problems, to provide feedback (e.g., results) received from classical computing subsystem 210 or quantum computing subsystem 240 to the other subsystem when appropriate, to assemble the results received from classical computing subsystem 210 and quantum computing subsystem 240 into an overall problem solution and/or to output the solution via input/output interfaces 250.

In various embodiments, control subsystem 230 may be implemented within classical computing subsystem 210 or may be a separate component of quassical computing system 200. For example, program instructions 216 may be executable by processors 212 to implement some or all of the functionality of control subsystem 230. This may include program instructions that, when executed by processors 212, implement some or all of the operations of method 100 illustrated in FIG. 1. In some embodiments, the classical computing subsystem 210 (which may include control subsystem 230) may serve primarily or solely as a problem preparation component and input buffer to quantum computing subsystem 240 and, perhaps, as an output buffer and postprocessor to put the output of quantum computing subsystem 240 into a form useful for and/or meaningful to the user.

Figure 3:
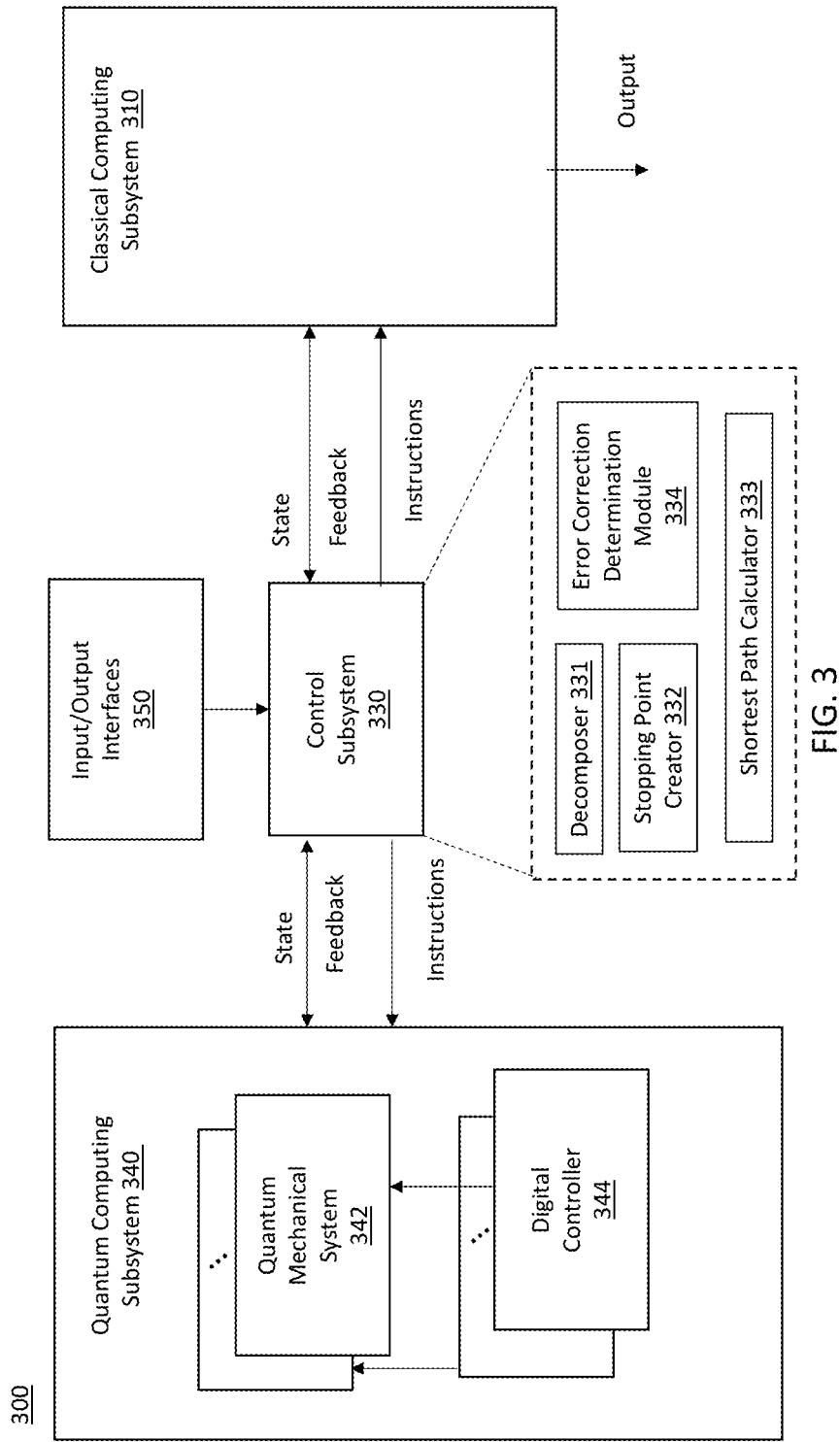
FIG. 3 is a block diagram illustrating a quassical computing system with multiple quantum mechanical systems in accordance with the disclosed subject matter.

FIG. 3 is a block diagram illustrating a quassical computing system 300 with multiple quantum mechanical systems in accordance with the disclosed subject matter. The quantum computing subsystem 340 is shown with a plurality of quantum mechanical systems 342 controlled by digital controllers 344. The digital controller 344 may be one controller.

The control subsystem 330 is shown coupled to the input/output interfaces 350. The input/output interfaces 350 may include application programmable interfaces (API). The control subsystem 330 may provide supervisor control of and between the quantum computing subsystem 340 and the classical computing subsystem 310 to deliver instructions, state information and control signals in response to feedback from the quantum computing subsystem 340 and/or the classical computing subsystem 310. The control subsystem 330 may include a decomposer 331 to decompose the problem statement into subproblems, in some embodiments. The control subsystem 330 may be a stopping point creator 332 to create stopping points or read-out points along a trajectory vector of a quassical space, as will be described in relation to FIGS. 12A-12C and a shortest path calculator 333, such as, based on coherence/decoherence for the quantum computing subsystem 340 and/or computational length and complexity for at least one of the quantum computing subsystem 340 and the classical computing subsystem 310, as described in relation to FIGS. 10A-10B. The control subsystem 330 may include error correction determination module 334 to determine the necessary error correction, if needed.

As described herein, a "quassical computer" is a hybrid of a classical computer and quantum computer where each is used, in a sense, as the "co-processor" of the other. Additionally, the quantity of quantum resources used (i.e., the size of the quantum co-processor) should be as small as possible, consistent with the problem objective, while still achieving the benefits of the quantum advantage, or nearly so, quantum supremacy. Quassical computer architectures may fall along a spectrum between "trivial" quassicality and "profound" quassicality.

The blocks of the methods and processes as described herein may be performed in the order shown, a different order or contemporaneously. In some embodiments, one or more blocks may be added or omitted.

Figure 4:
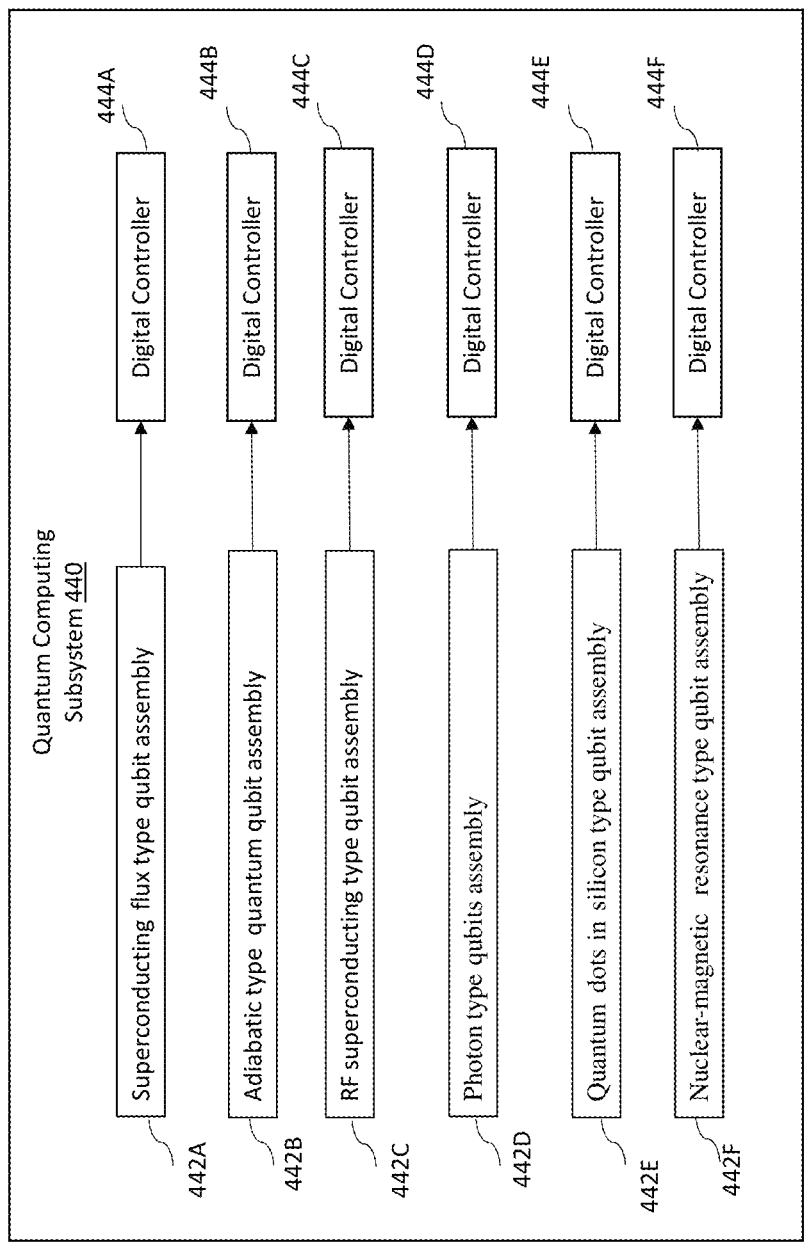
FIG. 4 is a block diagram of a quantum computing subsystem with multiple quantum mechanical systems.

FIG. 4 is a block diagram of a quantum computing subsystem 440 with multiple quantum mechanical systems. The quassical computing system 440 described herein may include any of a variety of types of quantum mechanical systems in the quantum computing subsystem 440 that are configured to interface with a classical computing subsystem. These quantum computing subsystems may employ different types of qubits to be assembled and interfaced via the control subsystem 230 or 330 with the classical computing subsystem 210 or 310. Qubits are the fundamental unit of information in a quantum computer, and each qubit is capable of existing in two states (e.g., 0 or 1) simultaneously or at different times. Examples of quantum computing subsystem 440 may include, without limitation, adiabatic quantum computers with an adiabatic type quantum qubit assembly 442B, quantum computing subsystems that employ radio frequency (RF) superconducting qubit assembly 442C (each of which is a piece of superconducting hardware that operates in the RF domain and has quantum states that can be manipulated) or other types of qubits in which a representation of the quantum state is based on a superconducting metal, those that employ quantum dots in silicon as qubits in qubit assembly 442E, those that employ photons as qubits in qubit assembly 442D, those that employ qubits represented by nuclear-magnetic resonance in a qubit assembly 442F (which is a stable technology but not very scalable), and those that employ superconducting flux qubits in qubit assembly 442A, such as the commercially available quantum computers provided by D-Wave Systems, Inc. Each type of qubit has its advantages and short-comings. Therefore, different quassical computing systems may include quantum computing subsystems that employ different types of qubits.

Each qubit assembly 442A, 442B, 442C, 442D, 442E and 442F may be controlled by a digital controller 444A, 444B, 444C, 444D, 444E and 444F, respectively, or a single digital controller. The digital controller may include at least one processor. Memory (not shown) may receive instructions form the control subsystem 330 to perform the quantum operations described herein.

The instructions of the methods and processes described herein may be executed by the processor or digital controllers of the classical computing subsystem, quantum computing subsystem, and the control subsystem. The instructions when executed may be performed in the order shown, a different order or contemporaneously. In some embodiments, one or more instructions may be added or omitted. Each digital controller, of FIG. 4, would receive its own instructions to perform any instruction in series or in parallel.

Figure 5:
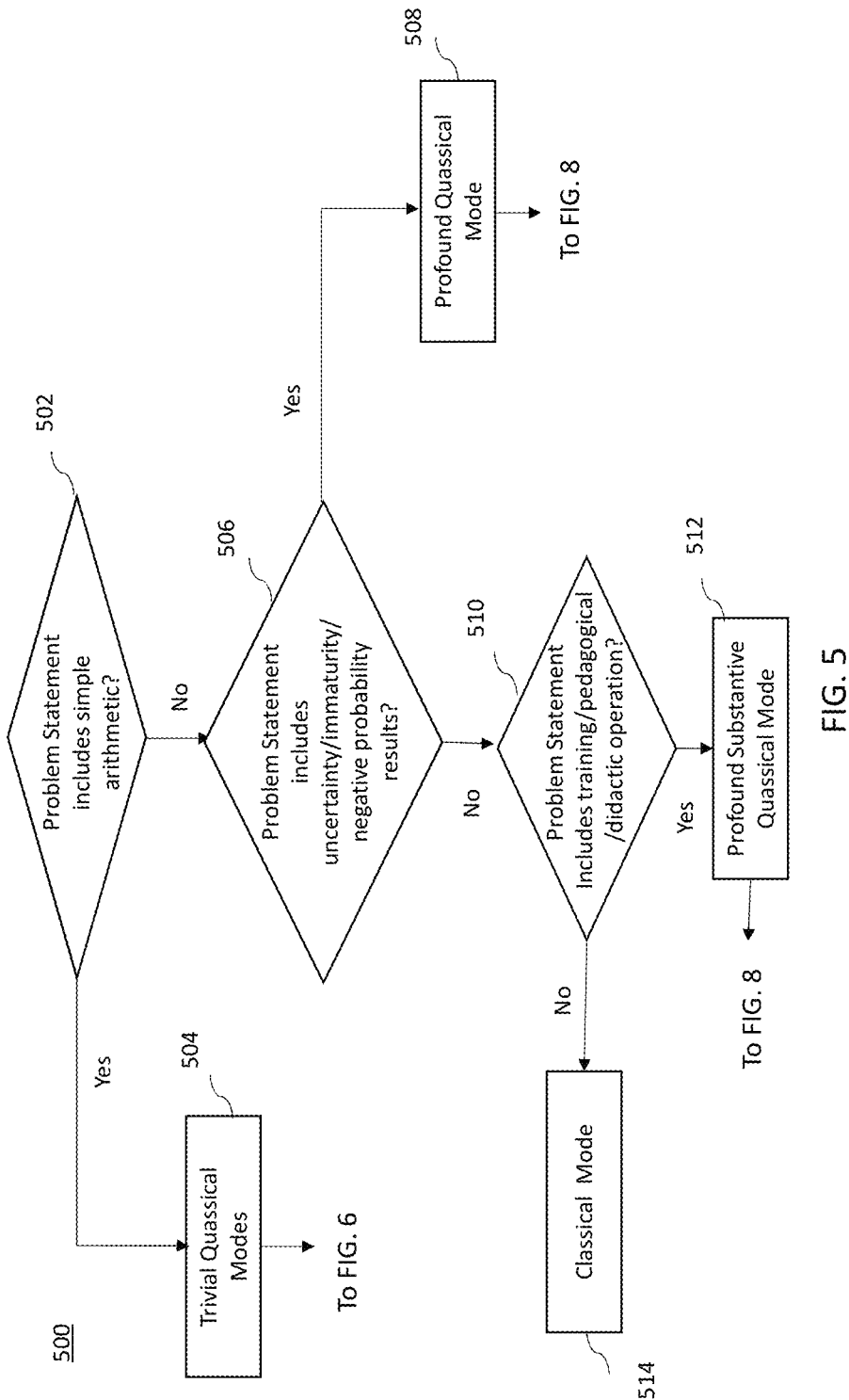
FIG. 5 illustrates a flow diagram of a process for determining a quassical computing mode associated with the received problem statement.

FIG. 5 illustrates a flow diagram of a process 500 for determining a quassical computing mode associated with the received problem statement. Quassical computing systems may be further understood by considering their operations in three modes making up its concept of operations: 1) "trivial quassical modes," 2) "profound quassical modes," and 3) modes that are in between profound and trivial modes, called "substantive quassical modes." The process 500 includes, at block 502, determining whether the problem statement includes simple or trivial computations or arithmetic. If the determination is "YES," then the system is configured for a quassical trivial mode, at block 504. The trivial quassical modes are described in relation to FIGS. 6 and 7. On the other hand, if the determination is "NO," the process 500 will determine if the problem statement includes uncertainty or may result in a negative probability result, at block 506. The problem statement may determine if the computations have immaturity. If the determination at block 506 is "YES," then the system is configured for a profound quassical mode, at block 508. The profound quassical modes are described in relation to FIGS. 8 and 9. On the other hand, if the determination is "NO," the process 500 will determine if the problem statement includes training, pedagogical or didactic operations associated with a profound substantive quassical mode. If, the determination is "YES," the system will be configured for a profound substantive quassical mode, at block 512. On the other hand, if the determination is "NO," the system may be configured to classical mode, at block 514.

Trivial quassicality includes architectural features where anything that can be done by classical computing means is removed from Hilbert space (HS) and done in classical phase space. This may include pre- and post-processing of the problem input and outputs. In addition, because quantum computing resources are much more expensive to use than classical computing resources, there is generally no benefit to having quantum computers perform simple arithmetic or house-keeping chores. For example, it is known that all Clifford algebra gates can be efficiently simulated with classical computers. Therefore, they could be, and should be removed to classical phase space unless there is some other overwhelming reason to perform those (i.e., algebraic) operations in Hilbert space. Some components of some applications of the quantum Fourier transform may serve as an example here, e.g., the Shor algorithm. Ultimately, this form of quassicality can be applied to segments of a computation where the classically computable operators (gates) can be moved to the beginning or end of a quantum operations sequence, or the quantum state prior to the application of a sequence of classically computable operations can be measured and stored efficiently.

Archetypical profound quassicality is evident when elements of the problem description are not understood or are understood only in terms of intractable digital representations that, in principle, could be easily emulated by simple quantum experimental analogues. Quantum computers (at least quantum analog simulators) are necessary because trying to accomplish the same computation with a classical machine would result in probabilities that are negative numbers. It may appear illogical to have a real event with a probability of occurrence less than zero, but one can argue today that this view is simply incomplete. Such probabilities have been shown to exist for centuries and have useful physical interpretations. For example, Euler's definition of logarithms of negative numbers, $$\log[-p(a)]=\log[p(a)]+i\pi(2 \cdot k-1),$$

implies there are 'k' solutions to an equation involving negative probabilities, thus an additional experiment is required to determine k), where a is some number; p(a) is some function; and i·π is equal to log (−1).

One system in which negative probabilities arise was disclosed in the calculus of the "quaternions." A feature of quaternions is that multiplication of two quaternions is non-commutative. A quaternion may be defined as the quotient of two directed lines in a three-dimensional space or equivalently as the quotient of two vectors. Quaternions are generally represented in the form: a+bi+cj+dk, where a, b, c, and d are real numbers, and i, j, and k are the fundamental quaternion units. Another quaternion characteristic is $i^2=j^2=k^2=ijk=-1$ where i is the square root of −1 as usual and j and k are new classes of imaginaries. The critical distinction here lies between the mathematics of quaternions and that of the ordinary vector calculus that was originally derived from it, is that the square of quaternion can be negative. Moreover, because the quaternion calculus can be simplified and reduced to standard vector calculus, quantum amplitudes represented as elements of quaternions can be resolved into components of, and can define, negative probabilities.

Due to the presence of three kinds of imaginary numbers, not only the measured probability of the event, but at least one, and often two, of the three quaternion imaginaries need to be known to solve a quaternion equation for the underlying amplitude components. Under the Born Rule, there are an infinite number of configurations of the component amplitudes that would lead to the same probability calculation. Therefore, at least one additional experiment would be required to isolate the last of the imaginaries, e.g., j and/or k. In this case, k is not considered a "hidden variable" because the only way to find it is by an additional experiment. Thus, k is knowable only ex post and is not knowable ex ante. Because there is no adequate quantum theory based on a hidden variable, it may appear that k is not determined or determinable ex ante. It is this ex ante unknowability of k that implies it is not a "hidden variable." Therefore, the quassical computational process may require determination ex post by a quantum simulation of a non-deterministic experiment. An ancillary point that follows from this discussion is that making the result of a quantum algorithm conditional on a negative probability is not equivalent to asserting that quantum effects are the effects of a "hidden variable." This is because the value of a negative probability is not knowable ex ante as a hidden variable would be. It is this "unknowability" that enables an escape from the hidden variable trap that has been proven to be unphysical by entanglement experiments. Therefore, it can be shown that a quassical computer is a realizable physical system.

Figure 6:
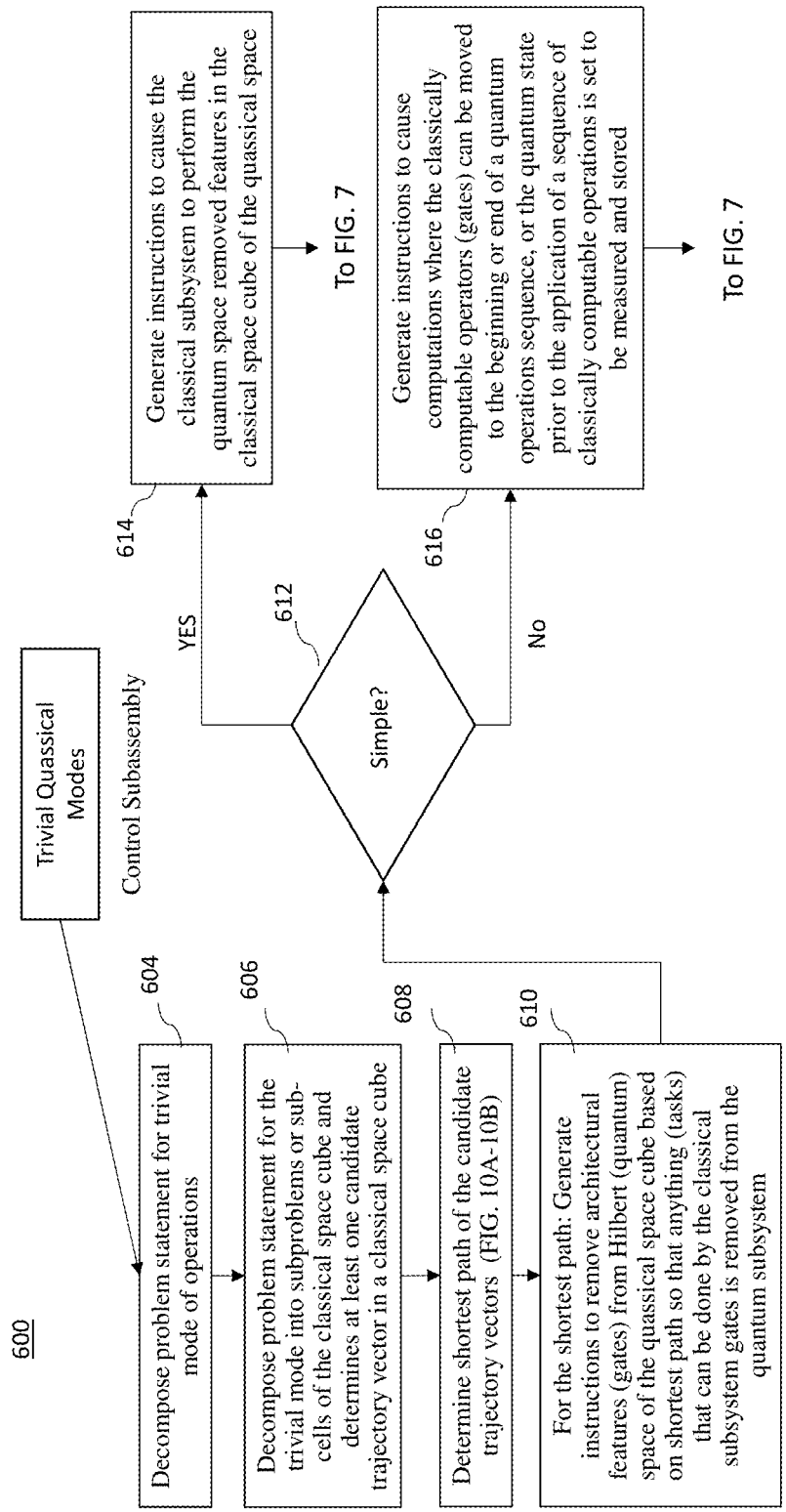
FIG. 6 illustrates a flow diagram of a process for the control subsystem in a trivial quassical mode to develop instructions for a shortest path in a quassical space.

FIG. 6 illustrates a flow diagram of a process 600 for the control subsystem 230 or 330 in a trivial quassical mode to develop instructions for a shortest path in a quassical space. The control subsystem 230 or 340 may decompose the problem statement for trivial quassical mode of operation, at block 604. At block 606, the process 600 decomposes the problem into subproblems or sub-cells in the classical space and finds at least one candidate trajectory vector. If quantum operations are used, the candidate trajectory vectors are based on the decoherence limits for each qubit.

Figure 10A:
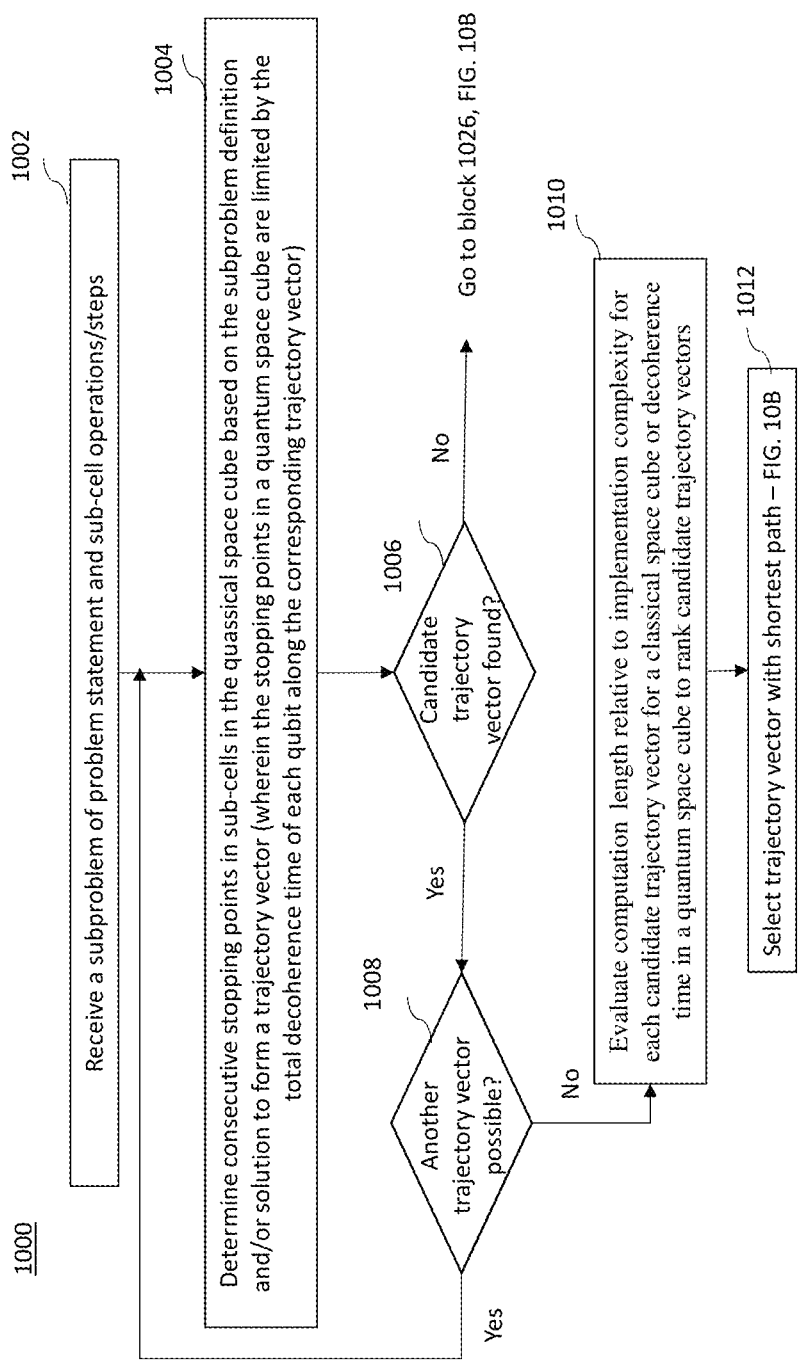
FIGS. 10A-10B illustrate a flow diagram of a process to select a trajectory vector with the shortest path in a quassical space.
Figure 10B:
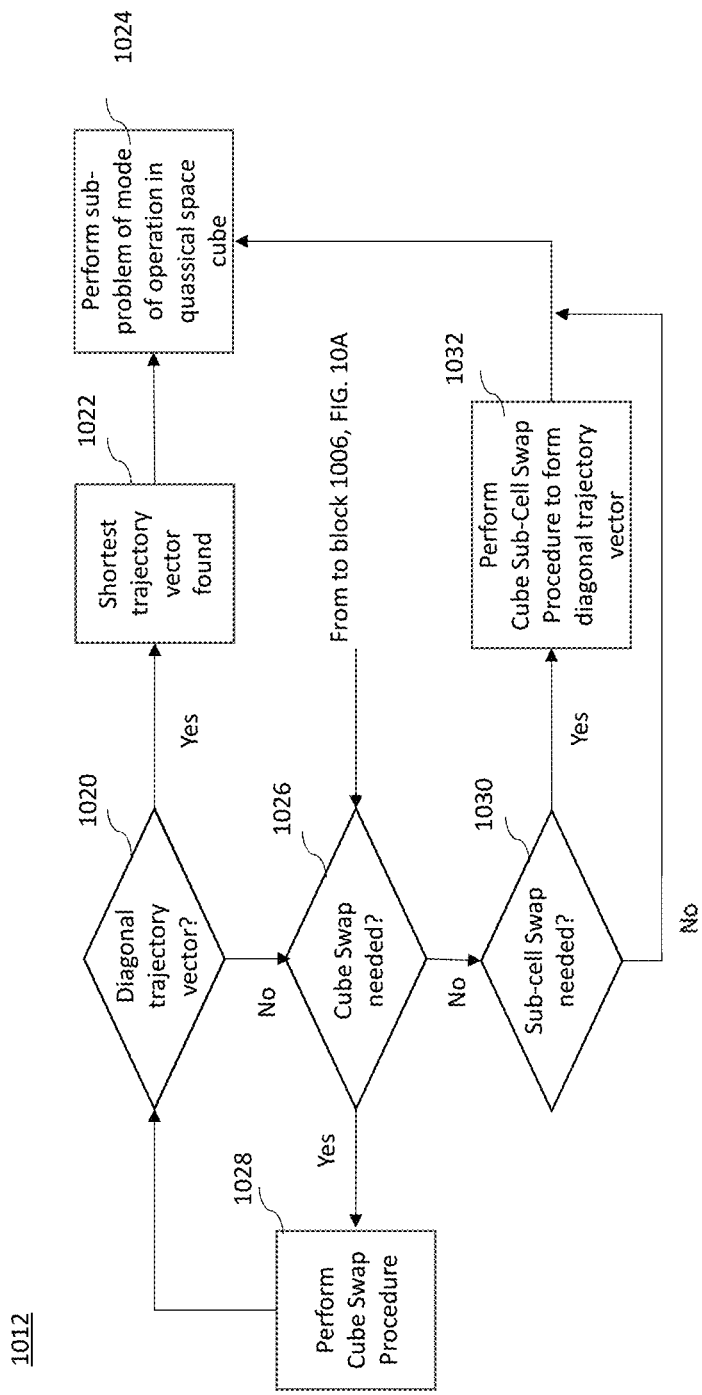

At block 608, the control subsystem 230 or 340 may determine the shortest path, as described in relation to FIGS. 10A-10B. At block 610, control subsystem 230 or 340 may generate for the shortest path instructions to remove architectural features (gates) from Hilbert space of the quassical space based on the shortest path. Then, anything (tasks) that can be done by the classical subsystem gates is removed from the quantum computing subsystem 240 or 340. At block 612, a determination is made whether the problem statement is simple arithmetic or a simple problem, for example. If the determination is "YES," at block 612, then instructions are generated to cause the classical computing subsystem to perform those removed features from the quantum computing subsystem 240 or 340, at block 614. In some embodiment, the system 200 or 300 may be virtually in nearly a fully classical mode.

Figure 7:
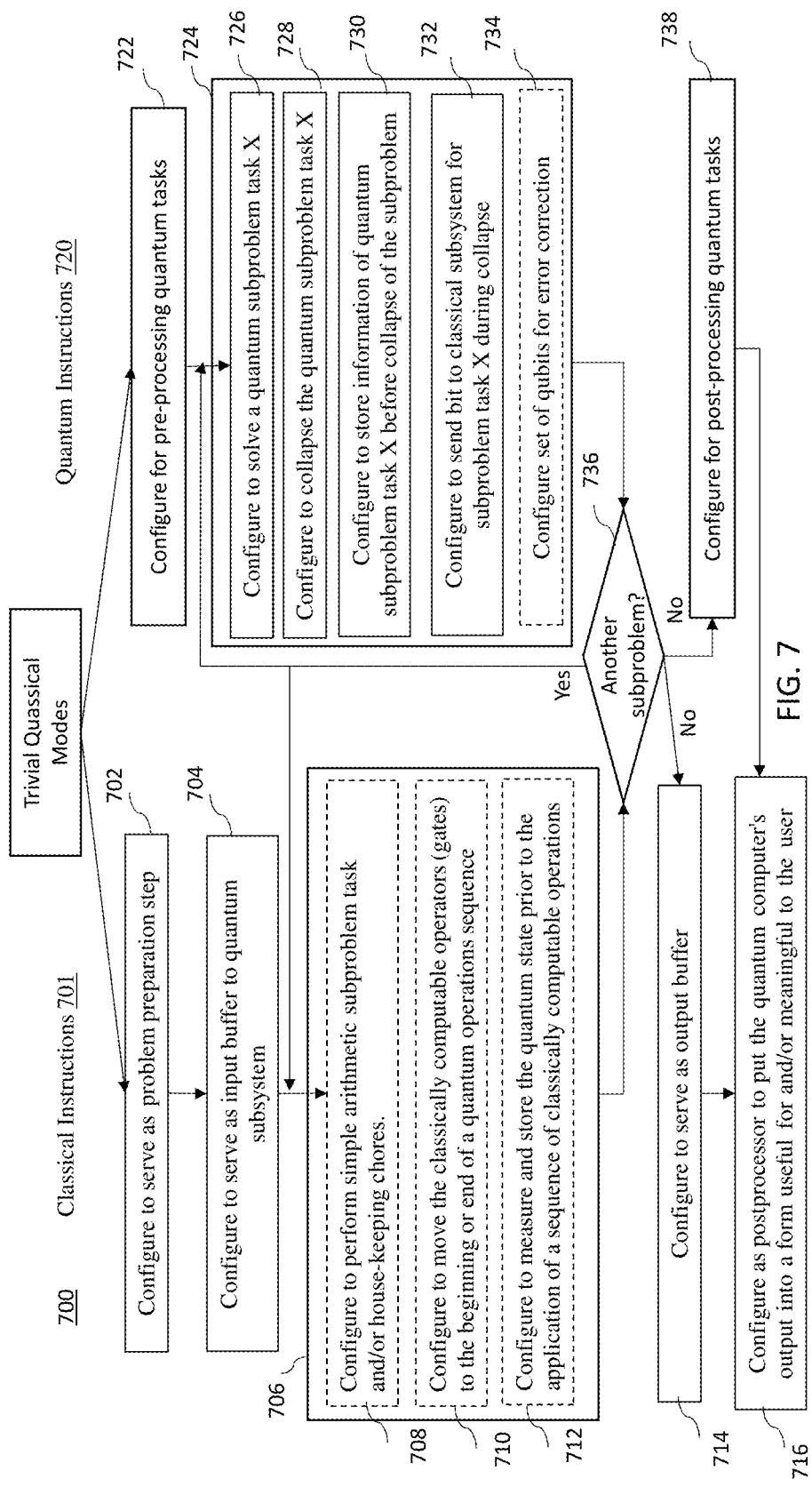
FIG. 7 illustrates a flow diagram of a process to carryout classical instructions and quantum instructions in the quassical trivial mode.

On the other hand, if the determination is "NO," at block 612, then instructions are generated, as described in relation to FIG. 7, to cause computations where the classically computable operators (gates) can be moved to the beginning or end of a quantum operations sequence. For example, if the classical computing subsystem is operated in a reverse direction (mode), the gate may be moved to the beginning of the quantum operation sequence and the corresponding beginning qubit. If the classical computing subsystem is operated in a forward direction (mode), the classically computable operators (gates) may be moved to the end of the quantum operation sequence and the corresponding ending qubit.

Alternately, the quantum state prior to the application of a sequence of classically computable operations of the classical computing subsystem 210 and 310 is set to be measured and stored by the control subsystem 230 or 340. The sequence of classically computable operations relates to those stopping points in and along a classical trajectory vector. The classical trajectory vector may have one or more steps wherein each step may include more than one stopping point.

These examples of instructions in the trivial quassical mode may vary based on the actual problem statement. For the sake of brevity, some of the steps and instructions generated herein have been omitted. Further discussion related to the instructions for the trivial quassical mode is set forth herein.

FIG. 7 illustrates a flow diagram of a process 700 to carryout classical instructions 701 and quantum instructions 720 in the trivial quassical mode. In the trivial quassical mode, the classical computing subsystem 210 or 310 may serve only as problem preparation step, at block 702 and input buffer to the quantum computing subsystem 240 or 340, at block 704 and, perhaps, in addition, as an output buffer, at block 714 and postprocessor, at block 716 to put the quantum computer's output into a form useful for and/or meaningful to the user.

Specifically, at block 702, of the process 700, the classical instructions may configure the classical computing subsystem to serve as problem preparation step. The classical instructions may configure the classical computing subsystem to serve as input buffer to quantum subsystem, at block 704. At block 708, of the process 700, the classical instructions may configure the classical computing subsystem to perform a simple arithmetic subproblem task and/or housekeeping chores, for example. The classical instructions, of the process 700, may configure the classical computing subsystem to move the classically computable operators (gates) to the beginning or end of a quantum operations sequence, at block 710. The classical instructions, of the process 700, may configure the classical computing subsystem or the control subsystem to measure and store the quantum state prior to the application of a sequence of classically computable operations, at block 712. The operations/instructions for a specific sub-problem, at block 706, of the process 700, may be varied based on the problem statement and each classical subproblem of the problem statement. The blocks 708, 710 and 712 are shown in dashed boxes to represent that the order of these blocks may vary and in some implementations of a particular subproblem, one or more of such blocks may be omitted and/or changed as appropriate to perform a housekeeping function or arithmetic operation(s). Furthermore, by way of example, block 708 may be repeated for different operations required for a single subproblem to be complete.

At block 736, of the process 700, a determination is made whether there are any other subproblems to be performed by the classical computing subsystem or by the control subsystem. If the determination is "YES," then the process 700 loops back to block 706. If the determination is "NO," then at block 714, the classical instructions may configure the classical computing subsystem to serve as output buffer. At block 716, the classical instructions, of the process 700, may configure the classical computing subsystem as a postprocessor to put the quantum computer's output into a form useful for and/or meaningful to the user. For example, the form may be alphanumeric values.

At block 722, of the process 700, the quantum instructions may configure the quantum computing subsystem for preprocessing quantum tasks. The quantum instructions, of the process 700, may configure the quantum computing subsystem to solve a quantum subproblem task X, at block 726. The subproblem task X may require one or more quantum gates and/or one or more quantum circuits. The quantum instructions, of the process 700, may configure the quantum computing subsystem to collapse the quantum subproblem task X, at block 728. At block 730, the quantum instructions, of the process 700, may configure the quantum computing subsystem to store information of quantum subproblem task X before collapse of the subproblem. The quantum instructions, of the process 700, may configure the quantum computing subsystem to send a classical bit to the classical subsystem for subproblem task X during collapse, at block 732. The quantum instructions, of the process 700, may configure the quantum computing subsystem to configure a set of qubits for error correction, at block 734, if necessary depending on the coherence to perform the subproblem X. The block 724 includes the instructions of blocks 726, 728, 730, 732 and 734. The instructions of block 724 may be varied based on the subproblem X wherein X is an integer number. For example, in some embodiments or subproblems, the error correction operation, at block 734, may be omitted. In other embodiments, a different type of error correction or error mitigation scheme may be employed. In some embodiments, the subproblem tasks are selected to minimize the decoherence time within the quantum space cube (FIGS. 12A-12C) to eliminate the need for error correction.

At block 736, a determination is made whether there are any other subproblems by the quantum computing subsystem or by the control subsystem. If the determination is "YES," then the process 700 loops back to block 724. If the determination is "NO," at block 738, the quantum instructions may configure the quantum computing subsystem for post-processing quantum tasks. Block 738 may be followed by block 716, previously described, to place the quantum computing output into a meaningful representation to the user.

In the profound case, a quassical architecture can execute an algorithm set where neither a purely classical nor a purely quantum machine could do so as a standalone machine. Certain problems may be profoundly quassical for two reasons: one is rooted in tractability/feasibility, and the second is rooted in the uncertainty/immaturity of the science underlying the problem. The second class is perhaps more profound than the first.

Although there are multiple well-defined problem sets in each class, an intractable/infeasible problem may be one that, for one example, requires more qubits, more interconnections between qubits, and a longer computational path than the decoherence time of the quantum system allows. This may also be impacted by the error correction scheme, if any, incorporated into it. An uncertain/immature problem that is profoundly quassical may be, for example, one where the underlying science or appropriate logical evolution is not clear enough in deterministic mathematics to be reduced to a well-defined statement except that it is known (or can be shown) that a quantum analog simulation or emulation exists. That is, a set of qubits can evolve experimentally as a simulation/emulation of the evolution of the quantum particles (though perhaps only approximately) that are the target of interest.

One example of this problem is that of defining a new catalyst to facilitate/promote a desired chemical reaction. In such an example, the initial state (including the input and initial resources) is known, the final state (including the output desired) is known and various constraints are known (e.g., amount of extra energy available, etc.). However, the mathematical and/or physical structure of the transformation function is complex, contains imaginary components, is complex in the sense of being multistage and/or is otherwise unknown. This is a generalization of a first order "system identification" type of problem. An analysis of a quantum computer of sufficient size and complexity to solve the problem will not be tractable using a fully classical approach (and if it were, it would not be necessary to build the quantum system). These systems can be designed with mathematics to meet classical computing aims, but ultimately the process as a whole will be beyond the reach of classical computing resources. The problem of checking and improving quantum information processing systems may be the most profoundly quassical process of all. Profoundly quassical problems cannot be solved efficiently by either a quantum or a classical computer operating alone but may be solved if quantum and classical systems are closely coupled and acting in concert.

As noted above, quantum computers standing alone suffer from two well-known and worrisome drawbacks that contribute to rendering a problem profoundly quassical: 1) short coherence times and 2) topological limitations on their internal inter-connectivity. The quassical computing subsystems described herein may allow escape from many, if not most, constraining performance burdens posed by these drawbacks. For example, the quassical computing approach reduces the scale of the quantum computer required to solve relevant hard problems (where "scale" refers to the number of qubits, number and topology of the interconnections between qubits, and amount of time required to run through the logic chain of the algorithm) by breaking the problem down into components that can benefit from using quantum resources (and running those on the quantum co-processor, e.g., on quantum circuits in 'Hilbert space') while running everything else on classical circuits (in classical 'phase space'). While the trajectory of states of the quassical computing system through quassical space (which is an amalgamation of classical phase space and quantum Hilbert space) is transiting through classical phase space, the challenge of incomplete and inadequate connectivity is greatly reduced in part because the classical state is much less subject to decoherence than the quantum space and not at all subject to the non-cloning theorem (and thus not so fragile). This is in part because the connectivity data channels through classical gates or circuits can be much longer and are not limited to nearest or nearby neighbors; and can be amplified and error corrected easily (again because they are exempt from the no-cloning theorem). As described herein, a quassical computing system is a special hybrid of a quantum computer with a classical computer, integrated into a seamless whole that uses a minimum of quantum resources.

A key limitation for quassical computing is that for the problem to be worked elegantly in a quassical computing system, it must be "decomposable" into smaller problems such that each can be worked in the quantum or classical processor and the various results must be assembled into a useful answer (or part of a useful answer) for the whole problem. Not all interesting problems are decomposable in this sense, but all problems in class "P" (polynomial time class) are decomposable and many others may well be. An important example of a decomposable problem is machine learning from a large data base. Learning is broken down or "decomposed" in various ways into training sessions. Each training session improves the resulting neural network to a degree so that it can be said to pass through increasingly higher stages of knowledge or learning. Initially, the network can be said to have "graduated" from "nursery school," then "grade school," then "high school" and so forth on the way to approaching, but perhaps never reaching, some ideal.

In general, pedagogical problems are decomposable in the sense that they may be broken down into steps of a learning process where the resulting knowledge may be, in fact, useable for some applications before full validity and verified certification is achieved and, indeed, may continue towards a higher level of perfection long after full utility is achieved. Thus, for example, the Romanian musical instrument factory has "learned" how to produce 10,000 violins per year. One can learn violin making from them. Then one can take their process and start modifying and perfecting it until one is able to produce "fine" violins, and then, perhaps, onto a handful of "Stradivarius-quality" violins per year, presumably worth just as much or more in annual turnover. But all these violins are serviceable in one concert setting or another, though of course the Stradivarius quality instruments are more suitable for solo performances in high court salons. It is the process of continual improvement post-certification (or initial operational deployment) that distinguishes the process in a quassical computing system from simple machine learning protocols.

Quassical computing can be thought of as an operating algorithm that parses a problem into its quantum components (subproblems) and its classical components (subproblems) and selects the most efficient trajectory through quassical space (e.g., the shortest path, however that might be defined). This may be accomplished in several ways depending on which system components are most costly or fragile. Using multiple smaller entangled states to circumvent the need for larger and more difficult to construct states or trading computation length for implementation complexity are two paths to this aim.

The classical computing subsystem proceeds step-by-step through an algorithm embodied and encoded into a serially executed "program trajectory," (sometimes referred to as a classical trajectory vector). At any given point along the trajectory vector, the computing subsystem can be said to have a "state". That state is defined by a stopping point along a cognitive trajectory from problem definition and setup to problem solution Like baking a cake, the initial configuration has all the ingredients laid out on the kitchen counter. The next configuration state includes all the ingredients, except the eggs, flour, and water, which are whipped together in a dough in a bowl. There are subsequent states until the finished cake is presented. At each stage of the project, the cake includes a collection of ingredients, some still existing in their store-bought form and others in a superposition of the store-bought form (e.g., one that's mixed together in a non-decomposable form that may include new chemicals resulting from reactions as the mixture is stirred, beaten, warmed and risen (as with yeast) and finally baked and cooled). The process can be stopped at selected points along the way (as is done on cooking shows for didactic purposes). Each time progress is stopped, what exists is a set of ingredients, some of which are non-decomposable "quantum superpositions" of others, and some of which are pure and unprocessed and are to be added to the superposition at a later stage of the process. The process cannot be stopped at any arbitrary point, but only at certain points at which all the ingredients are stable (e.g., at the various stages of the batter, the stage of the baked cake, the stage of the iced cake, etc.). At any stage where the progress can be stopped, the configuration is said to be in "classical phase space" and is robust against decoherence. One can take the batter, for example, to another location and finish the cake there, getting the rest of the ingredients at the second location. At this point, the interconnections between states are much more robust and there is more time and space available to manipulate things.

Similarly, for a quassical computing system 200 or 300, each project/problem consists of a series of steps, some classical, some quantum. During a classical step (e.g., on the way to the second location) the system is more robust, resistant to decoherence and stable than it is during a quantum step (e.g., the batter rising, baking, etc.). Thus, in the quassical computing system, the machine's instantaneous state is either in classical phase space, where it is resistant to decoherence and available to many kinds of interconnections, or in quantum Hilbert space, where it is much less stable, and may in fact be dynamic (e.g., taking on a superposition phase transition), and is susceptible to decoherence (e.g., the batter may not rise into a soft moist cake if subjected to a loud noise or an excessive heating schedule, etc.).

In the quassical computing system 200 or 300, the path from problem definition and setup to problem solution transverses segments in "solving space" or "solution space" that are either within classical phase space or within quantum Hilbert space. An important consideration in deciding which space to traverse for which portion of the trajectory is that when in Hilbert space, the states are transitory. In other words, one can only reside in Hilbert space for a limited period of time, called the "coherence time," unless special arrangements, not now well-understood except that they greatly increase the computer's overhead, are taken to prevent and/or correct for decoherence and associated losses. As a general consideration, though, whatever arrangements (e.g., error correction in its various forms, cooling of the system or shielding of the system against outside influences, such as with a Faraday cage) are made to extend the useable coherence time, one wants to remain in Hilbert space for the shortest possible time due to the cost of such measures. For example, error correction increases overhead and slows progress and, generally speaking, the cost of the quassical computing system will be proportionate to the time spent in Hilbert space. The least expensive quassical computing subsystem may be one that uses the fewest quantum resources consistent with its purpose. For example, in systems closer to the profound quassicality, processing stays on the quantum space as long as possible, gathering as much information as possible in the quantum domain. Subsequently, as much of that information as possible is transferred back to the classical domain where something may be learned about it using classical computations, after which further processing may be performed back in the quantum domain.

This means, among other things, that anything one can do in classical phase space, should be done in the classical phase space. This also helps to reduce monetary costs because qubits and their interconnections are much more expensive than classical bits. For example, for certain types of qubits, the cost can be more than $1,500 per qubit, while classical bits are extremely inexpensive. Even though the costs of qubits are likely to come down with mass production, classical bits are intrinsically cheaper than qubits because the overhead imposed on operations in Hilbert space (e.g., having to fight decoherence all the time, having to cool the qubits to cryogenic temperatures (to amplify quantum effects), having to establish a near-complete graph network for qubits, and so forth) will all conspire to maintain a deep cost differential between qubits and bits.

Figure 8:
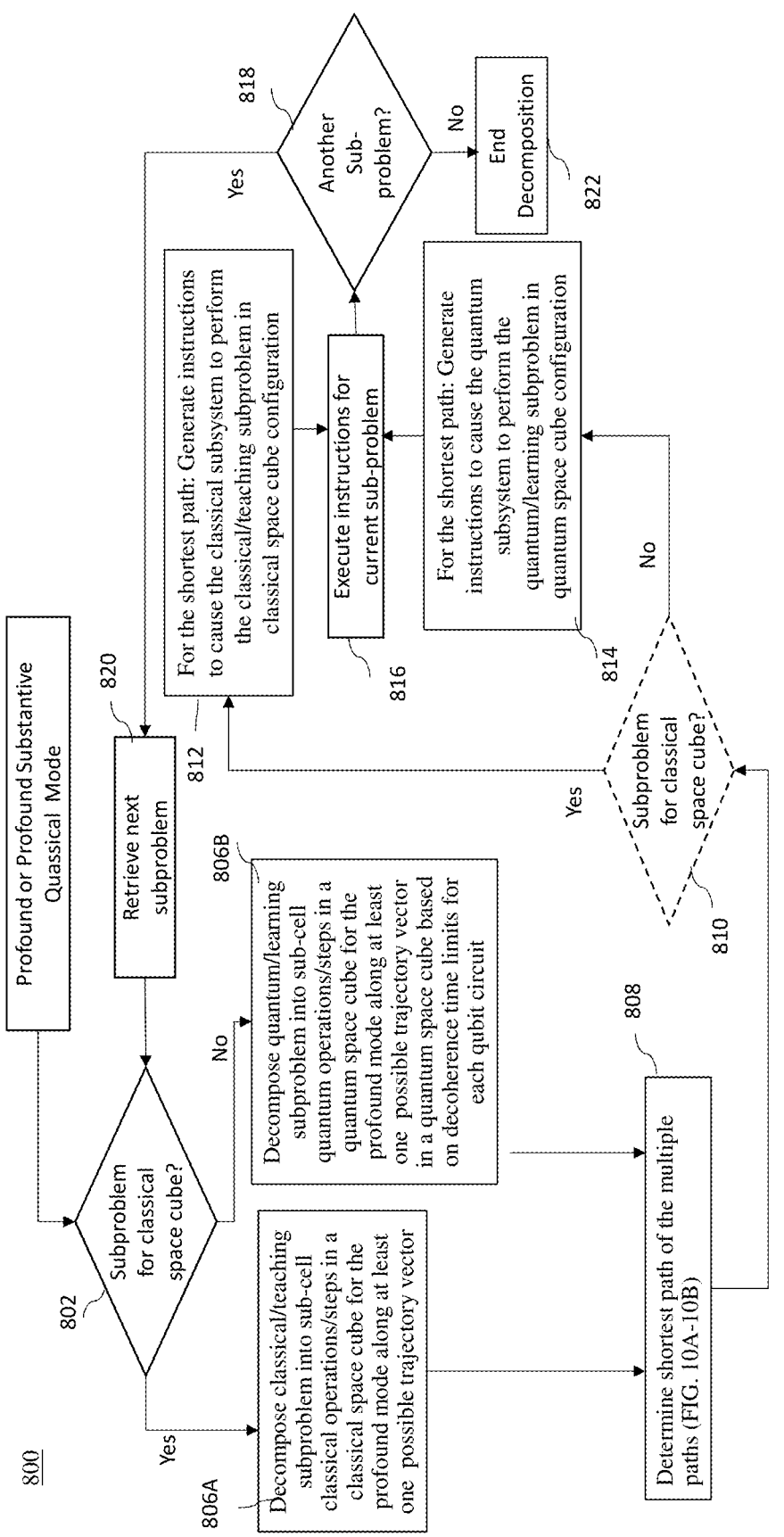
FIG. 8 illustrates a flow diagram of a process for the control subsystem in a quassical profound or profound substantive mode to develop instructions.

FIG. 8 illustrates a flow diagram of a process 800 for the control subsystem in a quassical profound or profound substantive mode to develop instructions. The control subsystem 230 or 330 may decompose the problem statement into classical subproblems and quantum subproblems. At block 802, the process 800 may determine whether the subproblem for a classical space cube. A classical space cube represents classical space or classical phase space. If the determination, at block 802, is "YES," then the subproblem is a classical subproblem for the profound quassical mode. In the profound substantive quassical mode, the classical subproblem is related to teaching computations carried out using classical computing gates and/or circuits. Then, at block 806A, the classical/teaching subproblem is further decomposed into sub-cell classical operations/steps in a classical space cube for the profound or profound substantive mode along at least one candidate classical trajectory vector, as will be described in more detail in relation to FIGS. 12A-12C. However, if the determination, at block 802, is "NO," then the subproblem is a quantum subproblem for the profound quassical mode. In the profound substantive quassical mode, the quantum subproblem is related to learning computations carried out using quantum computing circuits. Then, at block 806B, the quassical/learning subproblem is further decomposed into sub-cell quantum operations/steps in a quantum space cube for the profound or profound substantive mode, as will be described in more detail in relation to FIGS. 12A-12C. In block 806B, the at least one candidate quantum trajectory vector is determined based on the sub-cells in a quantum space cube and the corresponding decoherence time limits for each qubit circuit of the corresponding sub-cells in the corresponding quantum space cube.

The control subsystem 230 or 330, during the process 800, may determine the shortest path of the at least one possible path (trajectory vector), at block 808. The shortest path process will be described in relation to FIGS. 10A-10B. At block 810, a determination may be made whether the subproblem is for a classical space cube. If the determination is "YES," the process 800 continues to block 812. However, if the determination is "NO," the process 800 continues to block 814.

At block 812, the control subsystem 230 or 330 may generate instructions to cause the classical subsystem 210 or 310 to perform a classical/teaching subproblem tasks. Thereafter, at block 816, the instructions from block 812 are executed by the classical computing subsystem. At block 814, the control subsystem 230 or 330, during the process 800, may generate instructions to cause the quantum subsystem 240 or 340 to perform a quantum/learning subproblem tasks, such as related to machine learning. Thereafter, at block 816, the instructions from block 814 are executed by the quantum computing subsystem. In some embodiments, the problem statement is performed by alternating classical computations and quantum computations. At block 818, a determination is made whether another subproblem exists to complete the problem statement. If the determination at block 818 is "YES," the process 800 proceeds to block 820 where the next subproblem is retrieved, wherein block 820 proceeds back to block 802. If the determination is "NO," at block 818, then the decomposition process ends, at block 822.

As can be appreciated from the description herein, blocks 806B, 808, 814, 816, 818, 820 and 822 may be a dedicated path for quantum subproblem decomposition. Likewise, blocks 806A, 808, 812, 816, 818, 820 and 822 may be a dedicated path for classical subproblem decomposition. Thus, for the sake of brevity, common processes are not duplicated in FIG. 8 and merged by decision blocks based on the type of current quassical space subproblem.

A problem statement may include one or more classical subproblems and one or more quantum subproblems. The classical/training sub-cell operations may vary subproblem to subproblem. The quantum/learning sub-cell operations may vary subproblem to subproblem. In some embodiments, the trajectory vector with the shortest path may be determined for one subproblem at a time. Hence, the instructions of the subproblems to perform or solve a problem statement may be dynamically adjusted as candidate trajectory vectors are determined as the process moves from one quassical type space to another quassical type space.

Figure 9:
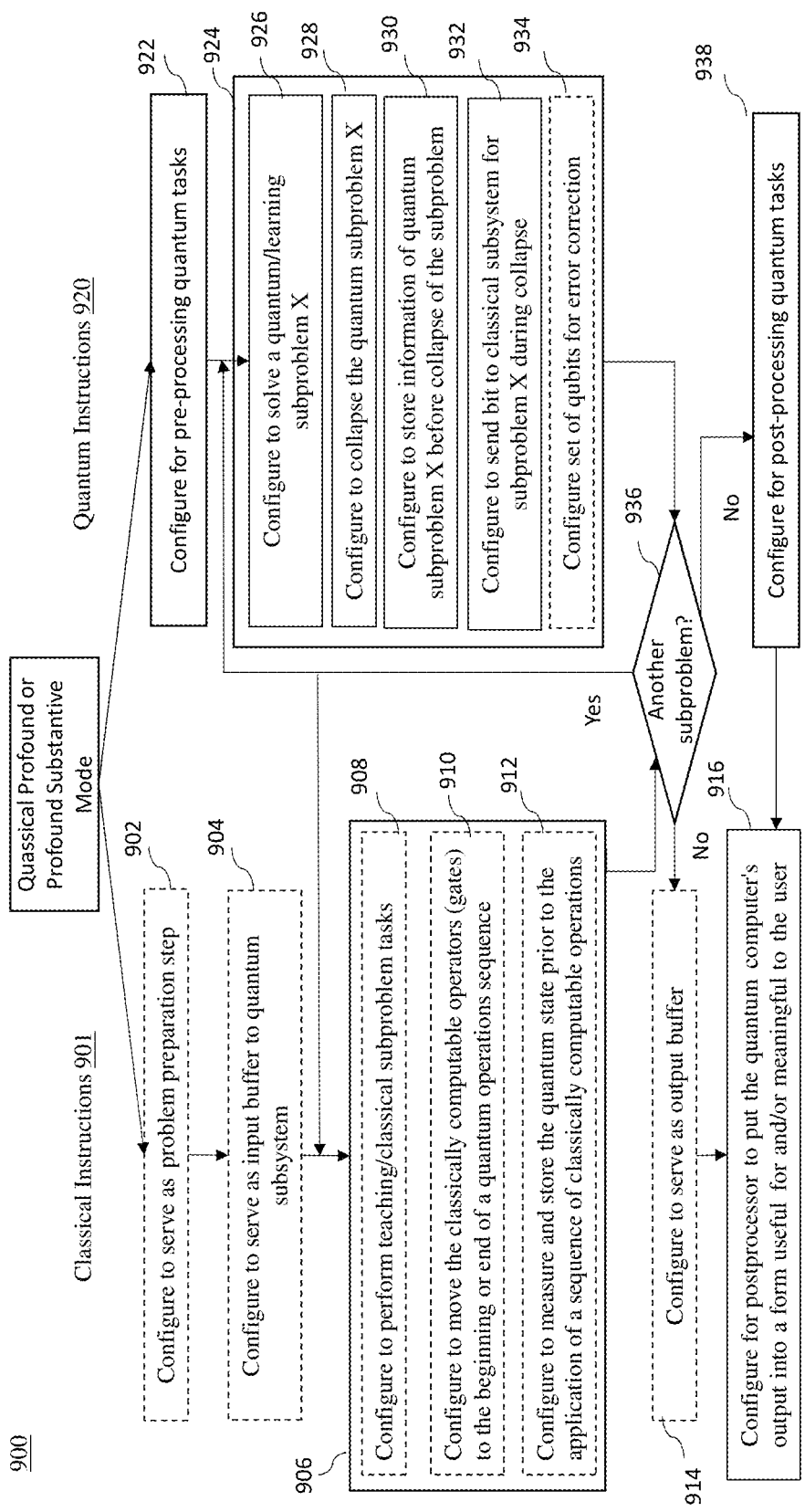
FIG. 9 illustrates a flow diagram of a process to carryout classical instructions and quantum instructions for the profound or profound substantive mode.

FIG. 9 illustrates a flow diagram of a process 900 to carryout classical instructions 901 received from the control subsystem 230 or 330 and quantum instructions 920 received from the control subsystem 230 or 330 for the profound or profound substantive mode. Blocks in dashed lines may indicate the operation of the block may be optional or performed in a different order. The classical instructions 901 of process 900 may include configuring the classical computing subsystem 210 or 310 to serve as a problem preparation step, at block 902. The classical computing subsystem 210 or 310 may be configured to serve as an input buffer to the quantum computing subsystem 240 or 340 at block 904. The classical computing subsystem 210 or 310 may be configured to perform teaching/classical subproblem tasks, at block 908. The classical computing subsystem 210 or 310 may be configured to move the classically computable operators (gates) to the beginning or end of a quantum operations sequence, at block 910. The classical computing subsystem 210 or 310 may be configured to measure and store the quantum state prior to the application of a sequence of classically computable operations, at block 912. The stored states from the classical computing subsystem 210 or 310 may be received by the control subsystem 230 or 330 and transferred to the quantum subsystem 240 or 340. Block 906 includes instructions 908, 910 and 912. In some embodiments, these instructions may be deleted, arranged in a different order or performed contemporaneously. At 936, a determination is made whether another subproblem remains.

If the determination is "YES," then, from block 936, the process 900 may loop back to block 906. If the determination is "NO," at block 936, then the classical computing subsystem 210 or 310 may be configured to serve as an output buffer, at block 914. At block 916, the classical computing subsystem 210 or 310 may be configured as a postprocessor to configure or convert the output from quantum computing subsystem 240 or 340 into a form useful for and/or meaningful to the user. In other words, the output may include numerical values.

Turning now to the quassical instructions 920, the quantum computing subsystem 240 or 340 may be configured for pre-processing quantum tasks, at block 922. The quantum computing subsystem 240 or 340 may be configured to solve a quantum subproblem task X, at block 926. The quantum computing subsystem 240 or 340 may be configured to collapse the solved quantum subproblem task X, at block 928. The quantum computing subsystem 240 or 340 may be configured to store information of the quantum subproblem task X before the collapse or during the collapse of the task X, at block 930. The quantum computing subsystem 240 or 340 may be configured to send a bit to the classical computing subsystem 210 or 310 for the quantum subproblem task X when collapsing, at block 932. The instruction for the quantum computing subsystem 240 or 340 may be configure a set of qubits for error correction, at block 934, when needed. The instructions at blocks 926, 928, 930, 932 and 934 in block 924 may be performed in the order shown, contemporaneously or a different order. In some iterations, one or more instructions in block 924 may be deleted and others may be added. At block 936, a determination is made whether another subproblem remains for the quantum computing subsystem. If the determination is "YES," then, from block 936, the process 900 may loop back to block 924. If the determination is "NO," at block 936, then the quantum computing subsystem 240 or 340 may then be configured for post-processing quantum tasks, at block 938. Block 938 may be followed by block 916. This result may be sent to the classical computing subsystem 210 or 310 so the result may be processed in a form meaningful to the user.

Substantive quassical modes of operation are typified by the pedagogical class of problems like machine learning, as discussed above. That is, machine learning, while tractable if the level of learning required is not too high, may nonetheless become intractable engineering-wise because the learning process takes too long with respect to the performance required. Machine learning on classical computers is notorious for taking large numbers of iterations and thus often days of computer time even on large systems. For example, a fully capable controller may be required to learn in real time in order to perform successfully. The Adachi-Henderson training algorithm using quantum resources (arXiv: 1510.06356v1), for example, discloses a way to speed up training of deep learning networks as might be part of an autonomous controller for a robot that would allow the robot to achieve real-time pedagogical improvement as it operates in the field.

Use of the elements of the quassical computing system described herein may allow for a quassical computer that is not universal in the sense that a gate model quantum computer or a classical Turing machine is universal. However, these elements lead naturally to a quassical real-time autonomous controller for a cyber-physical system (robot), as one non-limiting example.

Many current approaches are not quassical in nature but are either purely quantum or purely classical. Every classical mathematical problem can be solved either by a classical computer or a quantum one that is, in every case, a universal computer. However, a quassical computing system may or may not be universal in this sense. When the solution proposed is a quantum computer, it generally requires error correction to address the coherence challenge. When the solution proposed is a classical one, no error correction is required, but an error minimizing code in accordance with Shannon's 'noisy channel coding theorem' may be used. Error correction, in general (whether quantum or classical), requires that the state of the computer be represented physically by a larger number of elements than the minimum (thus reducing the channel capacity or increasing the resources required) so that there is redundancy in the representations that can be used to reduce the probability of error. This redundancy materially impacts the processing complexity and speed of the machine but is an inevitable cost of operation.

Redundancy is much less expensive (relatively speaking) in a classical computer than in a quantum computer. This redundancy overhead creates additional costs, risks and inefficiencies. For example, surface codes (widely regarded to be a leading class of implementable quantum error correcting codes) require a minimum of thirteen physical qubits to implement one error corrected qubit. However, this only applies to qubits with currently unachievably low noise rates. When multiple layers of the code are employed to compensate for currently feasible noise rates, a fault tolerant implementation may require thousands of physical qubits per error corrected logical (computational) qubit. The redundancies, in turn, exacerbate the interconnectivity problem. The quassical architecture minimizes the error problem by reducing the amount of time the computing system state must spend to evolve appropriately in Hilbert space to the minimum, or at least to something less than the maximum allowed by the decoherence time of the quantum circuit or gate. In one example, the use of quassical computing may reduce the amount of time that for which the complex quantum state needs to be preserved down to sub-microseconds. By decomposing the problem into separate quantum and classical functions/subproblems, the quantum state does not need to be preserved for as long as the system is purely a quantum computing system would. Running back into classical phase space before the error probability rises above a preselected threshold is not a way to correct error, rather it is a way to avoid errors on logical qubits and avoid accumulating errors on errors and on error correction qubits. In this way, the effective noise rates may be lowered, and the amount of error correction overhead minimized.

Common approaches to error correction are an expensive approach to solving the decoherence problem, increasing the cost of the computer by a multiplicative factor on the order of tens to thousands (in the case used as an example above). Quassical approaches described herein may require no redundancy at all, though modest redundancy may be designed-in and built-in to improve performance in a number of ways or for other reasons, all within the rubric of keeping the quantum resources of the quantum space to the minimum required to do the job.

Quassicality is also superior to purely classical or purely quantum approaches in that there are some problems that simply cannot be done in any other known way, e.g., quantum simulation, simulating one quantum system with another, being the most evident and possibly the most important.

A fundamental feature of quantum information processing in the quantum computing subsystem is that the state space is very large because, for a qubit, there is a continuous distribution of states between 0 and 1, rather than two states (0 and 1) as with a classical computing bit. Also, for every additional qubit, and because they can become entangled (i.e., their states can be correlated), the state space grows exponentially. Therefore, there is a lot of information contained in a quantum computation beyond what is contained in a binary bit in a classical computation. The challenges of quassicality include being able to extract the system state when it is about to collapse from the quantum space with enough information to continue running the calculation classically, and then to feed it back into the quantum space to continue. This approach will be successful for some problems and not others. However, it is believed that the matrix solver described in detail below is one for which this approach is likely to be successful.

Other examples of applications for which quassical computing is likely to be beneficial include, without limitation, machine learning on exponentially large data sets, simulations of classical and quantum physical systems, training neural networks (e.g., "deep learning"), simulating the electromagnetic behavior of quantum metamaterials like some catalysts, etc. Note that some projects cannot be produced by either a classical or quantum machine alone.

For example, the training of a complex useful neural network typically takes many, many computer hours. A mechanism has been developed for using a quantum computer to speed up the training of neural networks, reducing the amount of time to do this training by orders of magnitude. However, in many cases, quantum computers are not large enough to hold all the variables that they would need to hold in order to apply this technique to neural networks involving large numbers of variables. With a quassical computing approach, one can assemble the solutions of the smaller problems (subproblems) into which a large problem is decomposed to solve the larger problem when it won't fit on the computing system. This approach may be important for things like the control system for an aircraft. For example, there may be 50 million lines of source code in such a control system. To develop a version that has some kind of autonomy would require developing and training a neural network, which would be extremely complex.

In some embodiments of the systems described herein, quassical computing can be used to speed up the training/pedagogical/didactic component of a large problem. The pedagogical problems are a useful problem set because teaching is a problem that is naturally broken down into smaller problems (kindergarten through graduate school) and eventually results in a neural network that knows how to do things as elegantly as a human knows how to do them. For example, a neural network for building a violin becomes useful as soon as it can build a banjo. It becomes increasingly more useful as it learns to build a violin and maybe (eventually) it learns to build a Stradivarius. These are useful problems for neural networks and are perhaps the archetypical problem for a quassical computer because they can be worked on in stages. Therefore, a quassical computing system can be small, useful, portable, and inexpensive and has extensive learning potential, in some embodiments.

The potential benefits of the quassical computing approach described herein have been demonstrated by recent work on a medical information database for a drug trial. The deep learning strategy of creating neural networks produced a result that was able to predict whether or not a particular patient (with a certain body weight, race, height, medical history, and certain specific DeoxyriboNucleic Acid (DNA) SNPs, or single nucleotide polymorphisms) within a probability of three or four nines would have a good reaction, a bad reaction, or no reaction to a particular drug. The deep learning system took weeks of running on a large, high-performance computing center to get to that level of expertise, but only took a few minutes using a quantum approach. Similar problems that are so large and complex that a purely quantum approach is cost-prohibitive may be solved more easily and cost-effectively on a quassical computing system.

Another example of a quintessential problem for a quassical computing system could involve a controller for a robotic vacuum. Some of these devices include a Bluetooth wireless connection, in which case, the device could be connected to a quantum computer to make the controller a quassical computing system. In this example, the controller may be able to learn the best way to vacuum a first room. The device may then be put into a second room where the controller would learn the best way to clean the second room, and so on, as the controller learns the best way to clean many rooms. In this example, with each learning experience, the learning phase may take less time. This is likely not possible using either a classical or quantum computer alone. Quantum computing operations in general may be performed much faster than classical computing operations.

A vein of mathematical similarity runs through activities such as simulation, controls, machine learning, and optimization, as well as other fields. These activities, in general, can take advantage of a quantum co-processor, as part of a "quassical" computing architecture, to accelerate the solutions for a wide range of problems. For example, simulations of fluid flows, electromagnetics, mechanical structures, and so forth seek to find solutions to differential equations. In practice, the differential equations are discretized into a system of algebraic equations and if they are nonlinear, they are linearized to form a system of linear equations. Likewise, the differential equations governing control systems are reduced to linear systems of equations, and problems in machine learning also are eventually reduced to solving systems of linear equations.

Small linear systems are fast and easy to solve exactly. However, large systems, such as those born from complex control systems, fine-meshed 3D simulations, and so forth, and the capabilities of these systems rely on strategies for handling much larger problems. Direct solutions are inefficient, and therefore iterative solutions such as successive over-relaxation or Krylov space methods are usually used, with attendant worries about choosing the right initial guess and the right iteration parameters to ensure the quickest convergence to the correct result.

A spate of literature published recently has demonstrated how linear systems of equations can be solved simultaneously in a single operation on a quantum computer. As described below, a quassical computing system that implements an efficient matrix solver for a linear system of equations, finding x in Ax=b, has many practical uses.

Starting with the linear system Ax=b, the vector b is encoded onto an input qubit as $|b>$, the matrix A is encoded into the quantum gates that operate on $|b>$, and, with the addition of a few ancilla qubits, the quassical computing system can run through a short sequence of operations to produce an output qubit in state $|x>$ representing the solution x of the linear system. The computational complexity of this process is $O(1)$, but that does not mean the solution x can be found with complexity $O(1)$. The quantum state $|x>$ can only be measured in some way that necessarily fails to give the full solution. For example, the norm $<x|x>$ can be computed, or the value of a single component can be measured by projecting $|x>$ along a basis vector. But to get the entire solution for a system of size N, at least N calculation and measurement cycles must take place, as an absolute lower bound. With the quantum processors becoming available in the near future, it is likely that finding the complete solution to a linear system will be more expensive on quantum hardware than on classical.

Instead, it may be possible in the near term to use quantum hardware as a coprocessor in conjunction with classical hardware, by quickly deriving some useful information about the solution x from the quantum state |x>, and then using that information to speed up the classical iterative methods used to complete the solution of the problem. This does not directly address the scaling of the complexity with the size of the problem. However, it may practically address an important driver of central processing unit (CPU) time as an interim solution until more-powerful quantum algorithms for linear systems can be developed.

An example quassical algorithm would begin with the following, with (Q) representing a quantum computing step, and (C) representing a classical computing step:
1. (C) discretize and linearize system of equations into Ax=b;
2. (Q) prepare state |b>; and
3. (Q) solve for $|x> = A^{-1}|b>$.

An example algorithm could then continue with the following strategy:
1. (Q) use Grover's algorithm to find the maximum element of |x>;
2. (Q) recompute |x) and measure the inner product $<x|x> = \|x\|$; and
3. (C) constrain the search space for other elements of x using the upper bound $\|x - X_{max} e_{max}\| \le \|x\| - X_{max}$.

Another algorithm could start from step 3 and continue as follows:
4. (Q) perform a measurement M: <x|M|x>designed to constrain, e.g., ω (in this case, the relaxation coefficient in the successive over-relaxation iteration scheme).
5. (C) solve the linear system using successive over-relation (SOR) with ω as parameter for fast convergence.

One algorithm for quantum-computer solutions to linear systems was recently published. A recent experimental demonstration of this algorithm was performed on a 2×2 system, using photons as qubits.

The D-Wave, like all quantum computers (QCs) being developed today, requires some preliminary classical pre-processing step or stage to shape the problem into one the quantum computer can recognize and then post-processing stage to receive the data returned by the D-Wave and shape it into the answer the engineer needs. Quantum computers may be designed as cyber-physical systems, quantum mechanical systems controlled by digital controllers.

FIGS. 10A-10B illustrate a flow diagram of a process 1000 to select a trajectory vector with the shortest path in a quassical space. The control subsystem 230 or 330 may receive, at block 1002, the subproblem and sub-cell operations, as will be described below in relation to FIGS. 12B12C. The control subsystem 230 or 330 may determine, at block 1004, consecutive stopping points in sub-cells in the quassical space cube based on the subproblem definition and/or solution to form a candidate (classical or quantum) trajectory vector (wherein the stopping points in a quantum space cube are limited by the total decoherence time of each qubit along the candidate quantum trajectory vector). The term quassical space cube is a common term used to refer to either of a classical space cube and quantum space cube as in some embodiments, steps for the classical space cube and quantum space cube may be duplicative. The control subsystem 230 or 330 may determine, at block 1006, whether a candidate (classical or quantum) trajectory vector was found. If the determination is "NO," then block 1006 may proceed to block 1026 of FIG. 10B.

If the determination is "YES," a determination, at block 1008, is made whether another candidate trajectory vector is possible. For example, the control subsystem may attempt to find candidate trajectories vectors based on the size of the classical space cube or the quantum space cube or if any circuits are available that have not been previously considered.

At block 1008, if the determination is "YES," the process 1000 loops back to block 1004 where the steps 1004, 1006 and 1008 are repeated. If the determination at block 1008 is "NO," then at block 1010, the computational length relative to implementation complexity is evaluated for each candidate trajectory vector for a classical space cube or decoherence time in a quantum space cube. The candidate vectors are ranked based on the evaluation during block 1010. At block 1012, based on the evaluation in block 1010, the process 1000 will select the trajectory vector with the shortest path. The process 1000 to select the trajectory vector for either the classical space cube or the quantum space cube will be described in relation to FIG. 10B.

The process of block 1012 is described in FIG. 10B. At block 1020, a determination is made whether a candidate trajectory vector is a diagonal trajectory vector. If the determination is "YES," then the process 1012 identifies that the shortest trajectory vector, at block 1022, is found. The sub-problem is performed in the quassical (classical or quantum) space cube, at block 1024.

If the determination at block 1020 is "NO," then the process may determine if a cube swap is needed, at block 1026. If the determination is "YES," then the process may perform the cube swap procedure, at block 1028. An example, cube swap procedure is described below in relation to FIG. 12C.

After the cube swap procedure, the process may loop back to block 1020 to determine if a diagonal trajectory vector is found. However, if the determination is "NO," at block 1026, then the process may determine if a sub-cell swap is needed, at block 1030. If the determination is "YES," then the process performs a cube sub-cell swap procedure to form a diagonal trajectory vector, at block 1032, or nearly diagonal. The sub-cell swap procedure is described below in relation to FIG. 12B. Block 1032 may proceed to block 1024. If the determination at block 1030 is "NO," then the process may proceed to block 1024.

Figure 11:
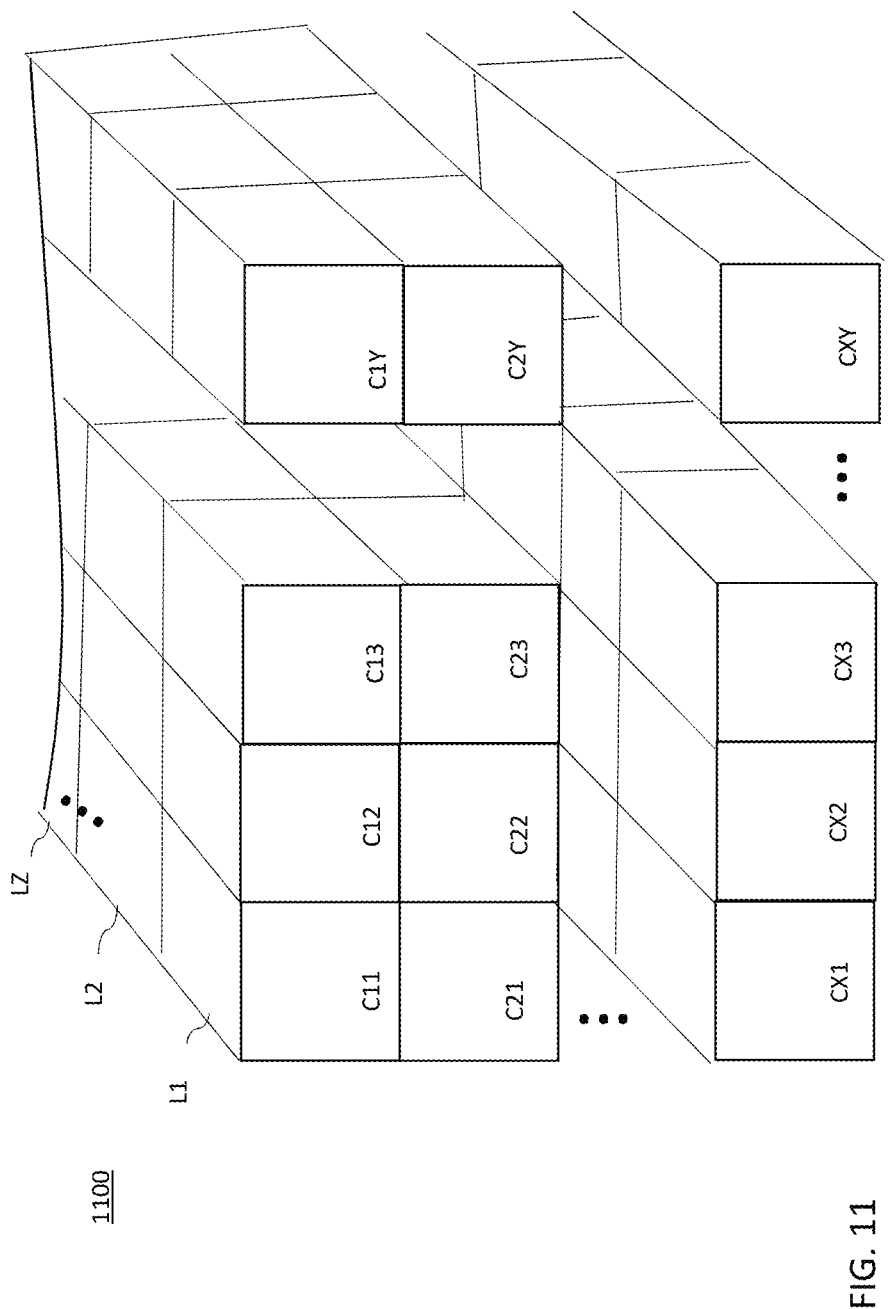
FIG. 11 illustrates a Cartesian or three-dimensional (3D) unit quassical lattice configuration of the quassical space.

FIG. 11 illustrates a Cartesian or three-dimensional (3D) unit quassical lattice 1100 of the quassical space. The quassical computer system 200 or 300 will include digital controllers to control the quantum mechanical systems as best seen in FIG. 3 or 4. Consider a simple Cartesian or three-dimensional (3D) unit quassical lattice 1100 or matrix configured to include one or more of logical structures, qubits, quantum gates, quantum circuits, classical gates, and classical circuits. Tracing a path from cube to cube to the right (as in reading a line of text in a Western book) is classical computing, a classical Turing Machine with each cube being a 'step' along the tape of a Turing machine, a Turing step. The cubes on the front face of the lattice 1100 are labeled cubes C11, C12, C13, . . . , C1Y which are cubes along a first row of the lattice 1100. The number Y corresponds to a non-zero integer number for a column. The cubes on the front face in the second row are labeled cubes C21, C22, C23, . . . , C2Y in the lattice 1100. The cubes on the front face in the Xth row are labeled cubes CX1, CX2, CX3, ..., CXY in the lattice 1100. The number X corresponds to a non-zero integer number for a row. The numbers X and Y may be the same number or different numbers in the tens, hundreds, thousands, millions, trillions, etc. Classical space cubes of the Cartesian quassical lattice 1100 may be surrounded by one or more adjacent quantum space cubes. The cubes of the front face may be part of a first layer L1. Cubes in subsequent layers L2, ... LZ stacked behind the front face cubes of the first layer L1 may be used to perform additional operations in parallel with cubes of one or more layers. Alternately, subproblems of cubes in a subsequent layer may commence after the last cube of a previous layer, for example. The Cartesian quassical lattice 1100 is described in cubes as the term "cube" implies a three-dimensional unit structure. However, the lattice may be an arrangement of three-dimensional (3D) cells or 3D unit structures. Thus, in some instances, cells and cubes are interchangeable herein to refer to a 3D geometric structure.

Also going from classical state to classical or quantum state implies a measurement and thus any quantum information that might have been present in the cell is collapsed into a single classical state in the ambulatory process. Typically, in classical computers, such a progression of classical states is not reversible, but that is not fundamentally so, it is so simply because classical computer designers have elected to design them that way. Thus, adding two numbers together to get one cannot be reversed if how the sum was originally partitioned is lost. But using techniques by Landauer and Bennett, classical computing can be made fully reversible by keeping a complete historical accounting of how all the partitions are collapsed.

Following the notion that irreversible computing is merely a special case of reversible computing where the accounting is ignored or discarded (uses less memory of course and speeds things up as complete accounting is intensive work), some of the embodiments herein may perform classical computing reversibly so that one may read a line of classical argument either right to left or left to right—doing a calculation or undoing it precisely. This decision may not so arbitrary either, for some embodiments if information is physical, as most have argued since the seminal papers of Landauer and Bennet, discarding complexity may at least partially collapse phase space and thus increase entropy and hence incur an energy cost. So, it necessarily generates heat whereas reversible computing is or can be fully adiabatic.

Accordingly, any cube in the lattice 1100 may be interpreted (reinterpreted) as a quantum or a classical datum. The classical state (described by some vector) may be reinterpreted as a quantum state (typically a superposition of some of quantum states, but also described by a vector); reinterpretation takes place wholly in the mind—there is no experimental counterpart, so there is no wave function collapse into classical information. Reversing in the classical space may be necessary in some instances associated with computing errors. In the case of computing errors, several sub-steps maybe reversed to recover operations before moving forward again.

Figure 12A:
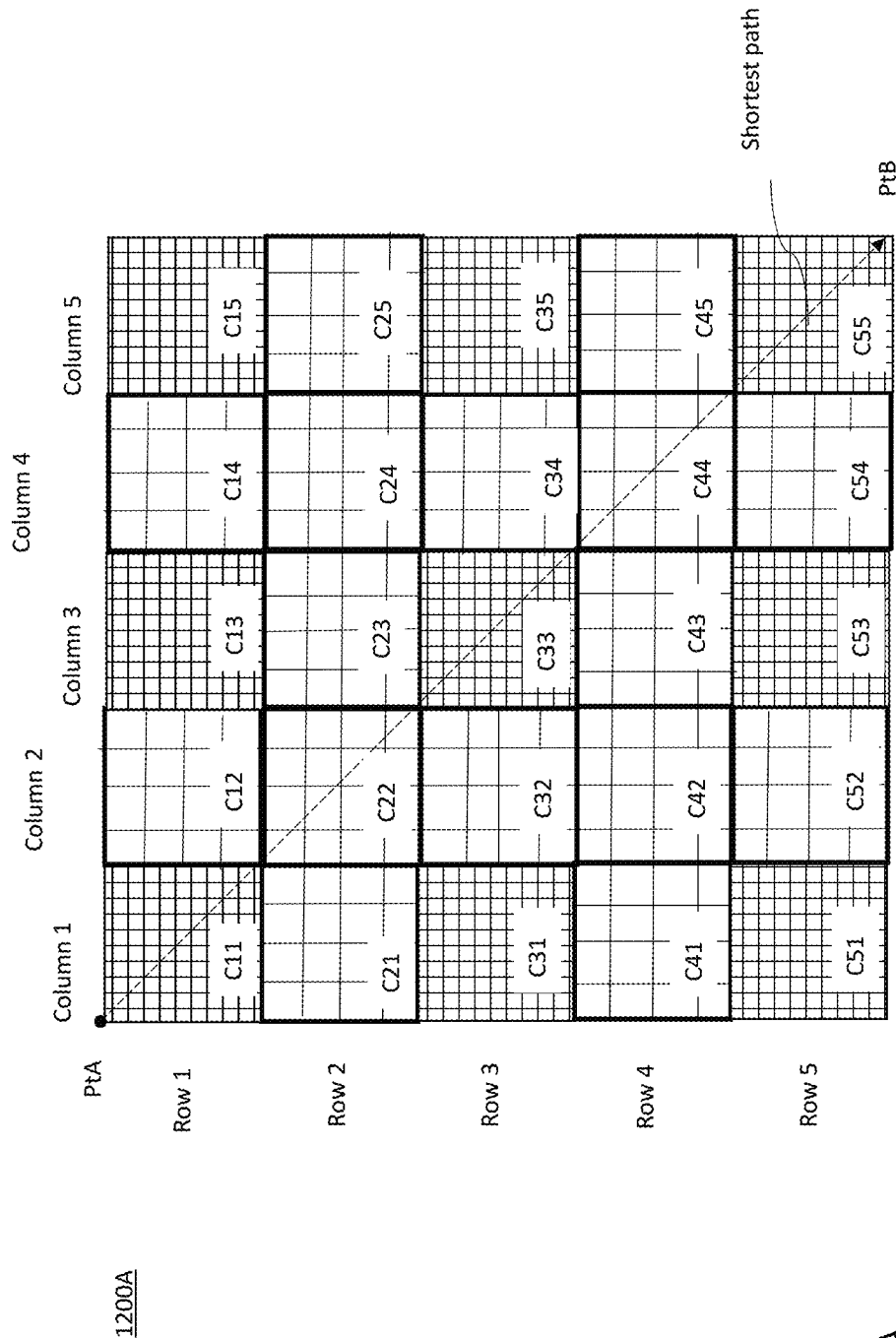
FIG. 12A illustrates an example Cartesian or three-dimensional (3D) unit quassical lattice of quassical space to solve a problem statement along a shortest path.

FIG. 12A illustrates an example Cartesian or three-dimensional (3D) unit quassical lattice 1200A of quassical space to solve a problem statement along a shortest path. FIG. 12A illustrates an arrangement of a Cartesian or three-dimensional (3D) unit quassical lattice 1200A having 5×5 cubes of quassical space in a first layer, for example, or any of the other parallel layers. The principles of the cubes in the first layer described herein equally apply to subsequent layers, shown in FIG. 11. An example quassical space is shown. The quassical space includes a pattern of alternating classical space cubes, denoted as cubes C11, C13, C15, C31, C33, C35, C51, C53 and C55 and quantum space cubes, denoted as C12, C14, C21, C22, C23, C24, C25, C32, C34, C41, C42, C43, C44, C45, C52, and C54. While the cubes are denoted as beginning at cube C11 in the first row and first column, the problem statement may be solved using all cubes of a lattice 1100 or a subset of the cubes in the lattice 1100.

The diagonal path or shortest path is configured to extend from a beginning point PtA to an end point PtB. The end point PtB corresponds to the final result. The Cartesian quassical lattice 1200A has a 5×5 cube configuration for the sake of brevity, as the lattice may have 5, 10, 20, 100, 1000, 10,000, a million or a trillion cubes, for example. The quassical space cubes may be arranged to be essentially touching adjacent and immediately surrounding cubes.

The cubes are arranged in rows and columns wherein cube C11 corresponds to the cube positioned in the first row and first column. The cube C12 corresponds to the cube positioned in the first row and second column. Likewise, the cube C21 corresponds to the cube position in the second row and first column. The first digit, after the "C," corresponds to the row number of the lattice or matrix. The second digit, after the "C," corresponds to the column number of the lattice or matrix.

The classical space cubes, such as cube C11, is denoted as hatched into 10×10 classical sub-cell (square) cubes (herein after sometimes referred to as "classical sub-cells"). However, the classical space cube may have any number of classical sub-cells including thousands or millions of classical sub-cells or sub-cell units. The term classical sub-cell unit may also correspond to a 3D unit, as the units can have other geometrical shapes other than a cube. Assume, for the sake of discussion, assume that each classical sub-cell corresponds to one or more mathematical operations or classical gates or circuits. In some embodiments, one or more classical sub-cells may cause the execution of one or more subroutines to perform an operation or subproblem task. In some embodiments, one or more classical sub-cells may cause the execution of one or more subroutines to perform housekeeping operations. In some embodiments, one or more classical sub-cells may initialize circuits as an input buffer to a quantum operation. In some embodiments, one or more classical sub-cells may initialize circuits as an output buffer for a quantum operation.

A non-limiting example of a quantum space cube configuration is shown. For example, a quantum space cube may include a plurality of quantum sub-cell units or quantum sub-cell cubes. In this example, the quantum space cube, such as cube C22 includes 4×4 quantum sub-cell units. Nonetheless, other quantum sub-cell unit sizes may be used.

The classical operations are reversible, as will be described in relation to FIGS. 13A-13B. For example, the classical operations trend in a forward or right direction. However, if there is an error, the problem's subproblems may be repeated. Thus, a reversal of operations may be required including classical operations.

Figure 12B:
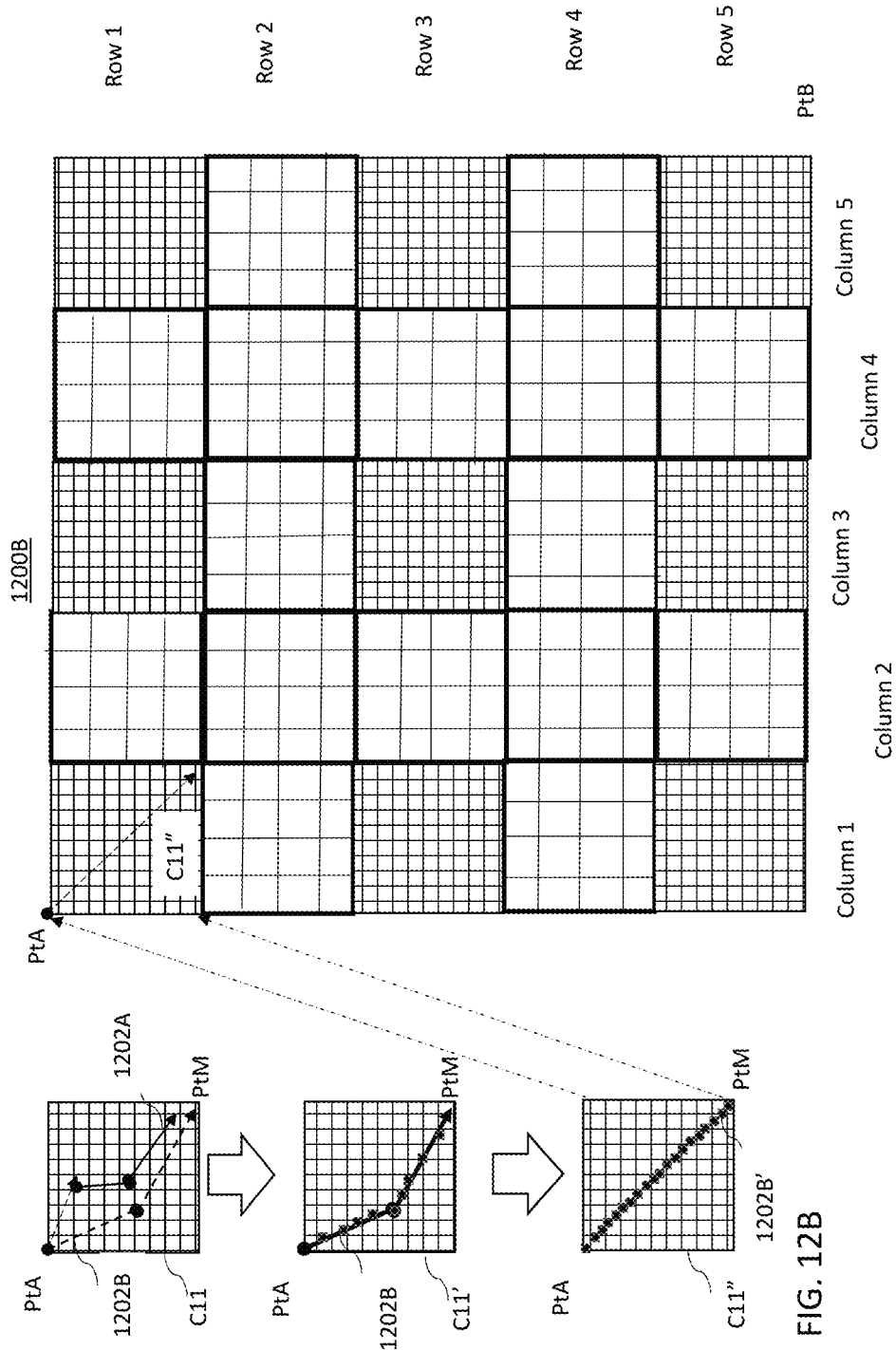
FIG. 12B illustrates a process for determining a shortest path using a cube sub-cell swap procedure.

FIG. 12B illustrates a process for determining a shortest path using a cube sub-cell swap procedure. FIG. 12B will be described in relation to operations of FIGS. 10A-10B. The classical circuits may include classical logic gates configured to perform a Boolean operation, for example. By way of non-limiting examples, classical logic gates may include a NOT gate, AND gate, NAND gate, NOR gate, OR gate, and XNOR gate. Some classical circuits may include programmable logic devices. The classical circuits may include, without limitation, flip flop circuits, memory circuits, computational circuits, diode circuits, transistors, memory circuits, switches, registers, and digital circuits, by way of non-limiting example. With reference to Cartesian or three-dimensional (3D) unit quassical lattice 1200B, the description related to the sub-cell swap procedure will be described in relation to a classical space cube, such as cube C11, corresponding to the cube in the first row and first column. The sub-cell swap procedure may be applied to any of the quassical cubes and should not limited to only classical space cubes.

The sub-cell swap procedure to determine the shortest path may include finding a plurality of candidate trajectory vectors from a starting point PtA to a measuring point PtM through consecutive stopping points in a quassical space cube, such as a classical space cube, as described above in relations to blocks 1004, 1006 and 1008 of FIG. 10A. In this example, assume the candidate trajectory vectors found correspond to vectors 1202A and 1202B in cube C11, configured as a classical space cube. A candidate trajectory vector corresponds to a consecutive string of sub-cells from a starting point PtA to a measuring point PtM. A search algorithm may be used to sort through the sub-cells to final a trajectory vector path using available sub-cells. In some instances, one a sub-cell is set in a candidate trajectory vector, the sub-cell may be removed from the next search iterations to find a subsequent trajectory vector. However, in some embodiments, the search algorithm may find candidate trajectory vectors such that some candidate vectors may share at least one sub-cell.

Referring now to cube C11', after all of the candidate trajectory vectors are formed, such candidate trajectory vectors are evaluated for a computational length relative to implementation complexity for each candidate trajectory vector for a classical space cube or decoherence time in a quantum space cube. The computational complexity may be a function of computing resources. The computational complexity theory may employ various algorithms to find the best or average case complexity based on one or more computing measures. Each candidate trajectory vector is ranked based on its computational complexity. Assume for the purposes of illustrations, trajectory vector 1202B is ranked highest (meaning the best-case computational complexity). The candidate trajectory vector 1202B becomes a selected shortest path, at block 1012. However, if the selected trajectory vector is not on a diagonal path or vector from point PtA to measuring point PtM, then sub-cells may be swapped to generate a diagonal path. A diagonal path may be created by virtually swapping gates or circuits of a sub-cell, in some sub-cells. In other embodiments, sub-cell swapping may combine two or more sub-cells (gates or circuits) into fewer sub-cells to reduce the computational complexity. For example, in mathematical operations, different sets of operations may be performed to achieve the same result. Some of these different sets of operations and the corresponding gates or circuits may be used if available in a cube, such as without limitation, to reduce the computational complexity operations. The points along the trajectory vector 1202B may be re-arranged into trajectory vector 1202B'.

Cube C11" represents the formation of a diagonal path using sub-cell swapping to align sub-cells consecutively in series along a diagonal trajectory vector 1202B' or path from a starting or beginning point to an end point or measured point. The configuration of cube C11 is changed to cube C11" by swapping one or more sub-cells to form a diagonal trajectory vector 1202B'. While the object in a sub-cell swap is to form a true diagonal path through the stopping points in a cube, the sub-cells may be swapped to from a trajectory vector which is closest to a diagonal path as possible, in some embodiments.

Figure 12C:
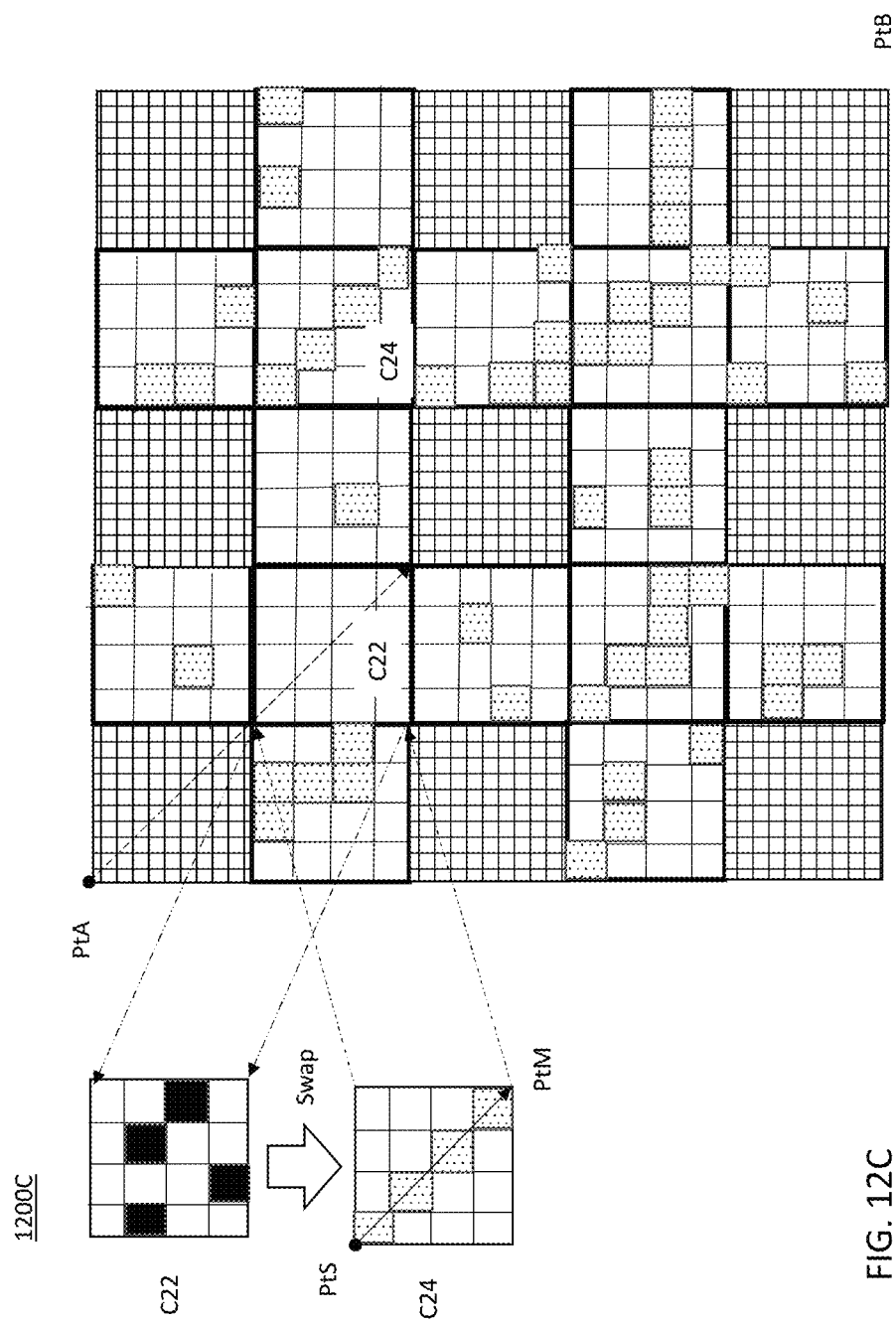
FIG. 12C illustrates a process for determining a shortest path using a cube swap procedure.

FIG. 12C illustrates a process for determining a shortest path using a cube swap procedure. FIG. 12B will be described in relation to operations of FIGS. 10A-10B. The cube swap procedure will be described in relation to a quantum space cube. However, the cube swap procedure may be applied to classical space cubes, as well. In some embodiments, a trajectory vector of a consecutive sequence to stopping points (sub-cells) from the beginning or starting point PtS to the measuring point PtM may not be found or achievable based on the gates available in the cube. Therefore, a cube swap may be employed to swap one cube with no candidate trajectory vectors with another cube with at least one candidate trajectory vector. In the illustrated example, cube C22 does not have a candidate trajectory vector such as one with a consecutive sequence of sub-cells in a path from point PtS to point PtM. In some embodiments, a trajectory vector may be found but with unacceptable decoherence/coherence time for the available quantum circuits in the cube.

Each sub-cell of a quantum space cube may include one or more qubits. Each sub-cell, in a quantum space cube may include a quantum logic circuit or quantum gate interconnected with other quantum logic circuits or quantum gates in adjacent and surrounding sub-cells of the same quantum space cube. Examples of known quantum gates may include, without limitation, a Pauli-X gate, a Pauli-Y gate, a Pauli-Z gate, a phase shift gate, a Hadamard gate, Controlled gate, square root swap gate, square root NOT gate, Deutsch gate, Fredkin gate, Ising gate, and Toffoli gate. Specifically, quantum logic circuits may be configured to perform a classical logic gate operation.

A search of candidate cubes may commence to find a cube which has at least one candidate trajectory vector. A candidate trajectory vector is one in which there is a consecutive sequence of sub-cells along a path between the points PtS and PtM and with an acceptable decoherence/coherence time. An acceptable decoherence/coherence time is an increment of time below the decoherence time limit where errors begin to happen or the probability of error increase significantly. In some embodiments, a search is conducted for a quantum space cube with a trajectory vector path that provides the lowest or lower probability of error(s) along the consecutive sequence of sub-cells to perform a particular sub-problem.

In the illustration, the sub-cells hatched with dots in the quantum space cubes represents sub-cells selected for carrying out a subproblem. Some quantum space cubes do not have a candidate trajectory and others have trajectory vectors. Assume, that quantum space cube C24 has a candidate trajectory vector with an acceptable decoherence/coherence time. Thus, the quantum space cube C22 is swapped with the quantum space cube C24. For the sake of brevity, the candidate trajectory vector is already on a diagonal path or nearly diagonal path between the points PtS and PtM. However, if the candidate trajectory vector was not on a diagonal path, the sub-cells of the swapped cube may, in some embodiments, be further evaluated for swap-out to form a close a possible a diagonal vector. A diagonal vector in a quantum space cube represents a set of qubits employed to solve a subproblem in the least or an acceptable decoherence/coherence time to reduce the probability of errors.

If the cube swap procedure is performed on a classical space cube, the diagonal vector may be a function of the best computational complexity for available classical gates or circuits. The length of time of operations in a classical space cube is not constrained. Thus, the number of sub-cells in a classical space cube can be greater than the sub-cells in the quantum space cube, as the operations in the quantum space cube is constrained by the decoherence/coherence time.

In view of the description of FIGS. 12A-12C, the classical space cube and the quantum space cube are independently configurable.

Figure 13A:
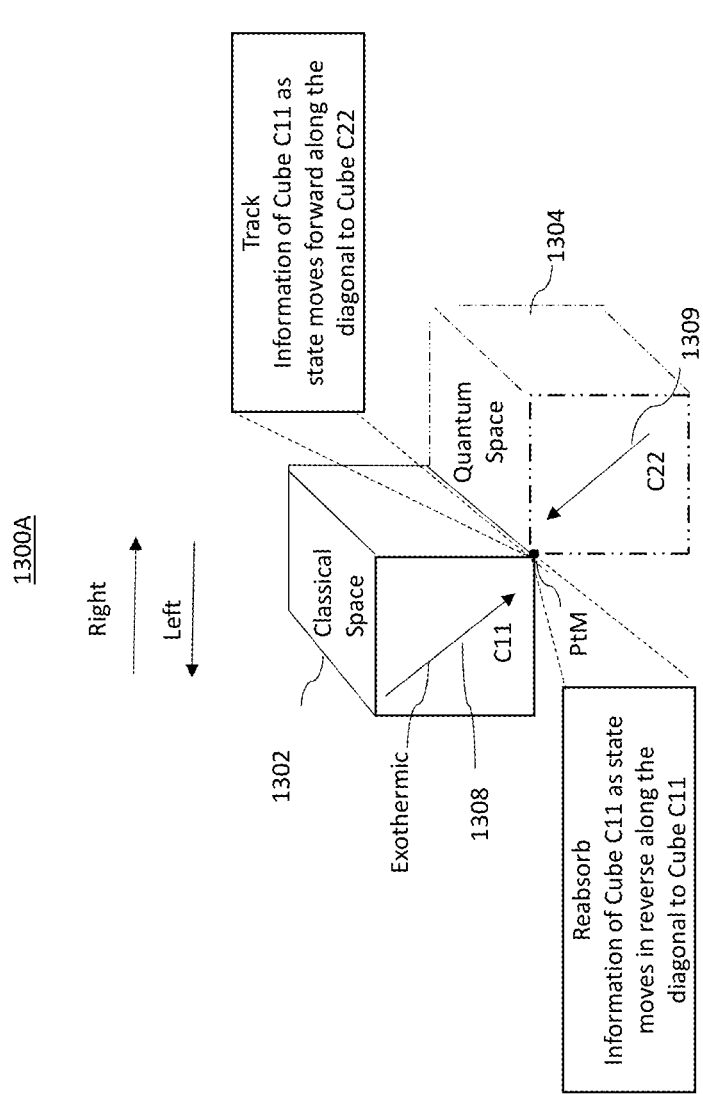
FIG. 13A illustrates a pair of quassical space cubes in the Cartesian or three-dimensional (3D) unit quassical lattice.

FIG. 13A illustrates a pair of quassical space cubes 1302 and 1304 of the Cartesian or three-dimensional (3D) unit quassical lattice 1300A. Assume, by way of non-limiting example, that cube 1302 corresponds to cube C11 in layer L1 and cube 1304 corresponds to cube C22 in layer L1. FIG. 13B illustrates a configuration of a quantum space sub-cell and classical space sub-cell in the pair of quassical space cubes. Classical information is merely a special case of quantum information, a projection of quantum information onto a less complex thermodynamic space. Both are vectors existing in the same vast Hilbert space (HS), but the classical vector is merely an irreversible (and hence exothermic) compression in complexity of the quantum one, a lower dimensional slice through Hilbert space (HS). The Hilbert space (HS) corresponds to at least one sub-cell in a quantum space cube. A physical realization of a profoundly quassical system might be one in which topological qubits form a new "third" dimension above the "conventional qubits" in the quassical space.

Heat emission is intrinsic to quantum measurement processes; when measured data is funneled down in complexity into whatever the measuring instrument can handle (within the quantum rules, e.g., the uncertainty principles, the no-cloning theorem, the Holevo bound, etc.), entropy is increased, heat is generated. But in the quassical model of the embodiments described herein, the additional data is not lost just stored elsewhere so the process can be adiabatic.

Trajectory length and slope through the quassical cube using this Cartesian or three-dimensional quassical lattice as a sketch pad, one can draw trajectories for computation using hybrid quantum-classical circuits, that is, quassical circuits. And most significantly, one can measure the distance between states that can be reached by combinations of traversing between states quantumly (upward or downward in direction) and classically (sideways in direction)—contracting the complexity from quantum to classical, and then re-expanding it back to quantum as required—no information is lost, no heat rejected.

Quantum computers are intrinsically reversible. However, when a qubit is "read," essentially all the quantum information stored in the qubit is destroyed except for the single bit that is "read" out and, subsequently, transferred to the classical space of a classical space cube. The fact that reading a quantum bit results in only a "single classical bit" of information and essentially all else is destroyed is called the Holevo Bound or Holevo's Theorem (q.v.). In the context of the quassical insight then: once the computer's execution point passes through the quantum classical interface (Holevo's Veil) into the classical phase space, in principle, access to all the quantum information that was not read out in the measurement process is lost—the quantum information that was destroyed or left behind. Thus, during the decomposition of a sub-problem into instructions for the quassical computing, there are decomposition strategies to employ in the quantum space cube and the classical space cube for the advancement through the lattice or matrix from one quassical space cube type to another cube type.

A first decomposition strategy may include selecting a read-out point in the quantum space cube to correspond to a stopping point in a quantum trajectory vector where the system can safely discard the quantum information abandoned in Hilbert space (HS). By way of non-limiting example, the selected read-out point may be a point that the additional available quantum information is not further needed as the quantum trajectory vector advances through Holevo's Veil. In other words, a read-out point may be selected to correspond to a stopping point in the quantum trajectory vector where available quantum information may be abandoned without affecting a quantum computing goal or result. This is analogous in the cake baking analogy to discard the egg shells, as a baker knows the shells will not be needed again in the cake baking process. A second decomposition strategy may include making a copy of classical information from a classical space cube and storing the copy of the classical information in the Hilbert space (HS) when it is known that such classical information will be needed in the course of subsequent quantum information processing.

There are also exclusions to the decomposition strategies. A first exclusion may include the "no cloning theorem" in the quantum space. In other words, a complete copy or a clone of a quantum state should not be generated. The quantum information we generate will have, until the realization of fully error corrected quantum computation, a limited lifetime that is a function of the coherence time of the quantum information platform upon which the computation is implemented. Thus, the long-term memory of the system may be simulated by configuring a qubit to hold a superposition of two pieces of quantum information in the quantum space cube, as a third dimension. The first piece of information corresponds to the quantum information (above/below current read-out point data 1372 of FIG. 13B) that the system wants to read-out currently (instantiation) at a respective one stopping point or measurement point in the quantum space cube. The second piece of information corresponds to quantum information (supplemental qubit information 1362 FIG. 13B) that the system wants to save for later recall or use.

Thus, the system may be configured to "split" the quantum information stored in the qubit's superposition with a series of quantum gates distributing/splitting the quantum information into two other qubits and each of those "other qubits" can be read separately with the resulting classical information (i.e., the "single classical bit") being stored classically. The classical information (i.e., the "single classical bit"), thus harvested from the quantum space cube, can then be used (in whole or in part) either to initialize the classical portion of the next computational step, such as a stopping point in a classical space cube, and/or initialize (reinitialize) the next qubit in the quantum space cube when the time comes (another stopping point) to send execution back into Hilbert Space behind the quantum veil. The initializing types of bits and their resulting qubits are called "ancilla bits" and "ancilla qubits."

The "split" of the quantum information does not defeat the Holevo Bound or the "no cloning theorem" because the total amount of quantum information is conserved as is the classical information. In effect the splitting of the quantum information into two parts does not create new information, so the act of reading out the two qubits creates, in effect, two bits of classical information which, when combined in any possible scheme, cannot exceed the information quantity of a single bit—in effect, each such piece of information is a "half bit."

Figure 13B:
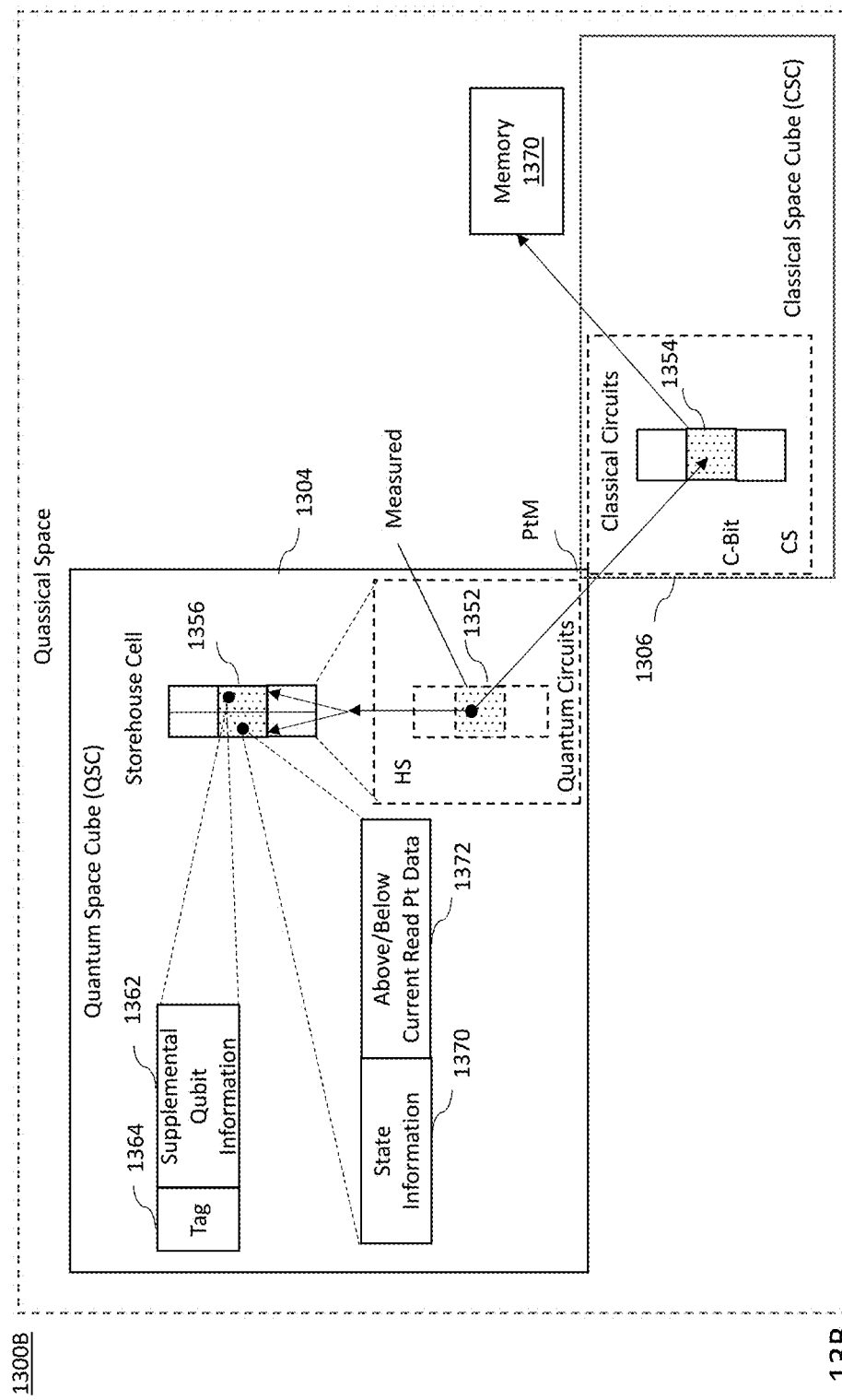
FIG. 13B illustrates a configuration of the quantum space sub-cell and classical space sub-cell in the pair of quassical space cubes.

Referring also to FIG. 13B, in order to assure classical reversibility, of course, the information in memory 1370 (FIG. 13B) is put aside each time a step is taken to the next cube to the right (quantum reversibility is assured by the laws of physics), denoted by arrow 1308 of FIG. 13A, and reabsorb that information, at measuring point PtM, each time a step is taken to the next cube to the left, denoted by arrow 1309 of FIG. 13A. Likewise, each time a qubit is measured, collapsing its information content down to a classical bit (C-bit), the information not embedded in the classical bit (C-bit) may be accounted for (by the use of ancillas) and stored, if required, off-line in memory 1370, so it can be restored in the reverse operation—reinterpreting a bit as a qubit. The information is tracked as the state moves generally right from one cube to another cube at a measuring point PtM. The classical bit (C-bit) when the quantum space cube collapses information is interchangeable with the "single classical bit."

This is an imagined reversal of the quantum measurement process. "Off-line" here means in a cube or cubes not part of the two-dimensional (2D) pathway through the lattice—thus implying the existence of a third dimension (which, of course, may be merely a remote and unused portion elsewhere on the same lattice or cube). And, the stored data (i.e., supplemental qubit information 1362) in the storehouse cell 1356 of quantum space cube 1304 may be stored in the correct order according to the way it was generated as is required to achieve the reversal (or tagged via tag 1364 so that the correct sequence can be reconstructed when re-expanding it to its unreconstructed status).

Thus, the complete embodiment of the idealized quassical space is a three-dimensional (3D) volume, a cubical information structure each slice of which contains quassical information. A 'circuit' in this embodiment is any pathway from cell to adjacent cell, etc., traced through the quassical cube 1300B of FIG. 13B, making use of an orthogonal dimension storehouse 1356, as necessary. Consequently, the third dimension, meaning the order, structure, and, thus, entropy of the storehouse 1356 is determined by the history of calculation because it may contain all data required to render the calculation reversible—so it is not unconstrained and thus not a true "degree of freedom" in the strict sense of the phrase.

Now define the length of any pathway through the quassical cube, for in that definition lies one of the fundamental aspects of the quassical insight. It is related to the circuit depth: "the depth of a circuit" through a computer, as Preskill writes, is the number of time-steps required, assuming that gates acting on distinct bits can operate simultaneously (that is, the depth is the maximum length of a directed path from the input to the output of the circuit). As noted in Preskill, an irreversible computation can be transformed to a reversible one by replacing NAND gates by Toffoli gate.

The "width of a circuit", the maximum number of gates (including identity gates acting on "resting" bits) that act in any one-time step, quantifies the storage space used to execute the computation. Taking a two-dimensional (2D) slice through the quassical cube of sub-cells, then each sub-cell of that slice may be a special gate. The special gate is a quassical gate. In some embodiments, the quassical gate may be configured to perform a classical equivalent gate or logic operation. Thus, the special gate may be one that exhibits quantum-classical duality.

There are some obvious things to say about a quassical space cube 1300B: first, it can contain all meaningful data and thus all physical states (implied to include any associated data, their 'quassical meanings') have a home somewhere in the 3D cubic volume.

Second, each datum in a quassical cube has the dual quantum-classical character so each unit "cube" is really at least a column of sub-cells 1352 and 1354 storing both the state information itself in storage unit 1370 and, in storage unit 1372, data above and below that sub-cell and/or cube that is required to traverse it in any of the four possible directions: up, down, right, left (recall this "additional dimension" is not independent) so each is a "slice" through a qubit, in a quantum space cube type. It may, of course, be better understood if each sub-cell or quantum space cube is considered a quassical unit computer, a universal quassical gate, containing the minimum functionality to serve both its local and its system-level purpose. The classical space cube 1306 includes a sub-cell 1354 configured for classical operations with classical gates or circuits.

Is the model of quassicality described above equivalent with adiabatic quantum computing? The answer is negative: quassical computing is more powerful than quantum annealing/adiabatic quantum computing because it is Turing complete, whereas the latter is not by a well-known equivalence.

A quantum computational supremacy experiment has to prove both a lower bound and an upper bound. The upper bound comes from the running time of a quassical algorithm and the lower bound is necessary for proving that no classical computer can match it. Proving lower bounds is notoriously more difficult to prove than upper bounds; verifying them experimentally is even more demanding.

One of the first non-trivial examples of quassical algorithms is related to Grover's quantum algorithm (which, solves the following problem: access to an unsorted quantum database that can be queried with a quantum input is given and asked if it contains a specific entry).

Grover's algorithm offers a provable speedup, though not an exponential one and, more importantly, the problem it solves is far from being realistic: the cost of constructing the quantum database could negate any advantage of the algorithm, and in many classical scenarios one could do much better by simply creating (and maintaining) an ordered database.

In some embodiments, each quantum sub-cell of a quantum space cube is made so finely that the process of stepping from one sub-cell to the next can be considered a continuous one defining a pathway that is a continuous process i.e., drawn as a continuous line—not a discrete walk of many steps.

As shown in FIG. 12A, then it becomes clear that, in general, the shortest distance between any two locations or points in the cube (between, that is, an input problem statement and its answer output) may be along a diagonal, as best seen in FIG. 12A, cutting across quantum and classical evolutions alike and thus may include both quantum-like and classical-like operations, for it is only in rare and improbable cases that a purely classical route or a purely quantum route will be optimal.

In a perfect world this shortest distance is akin to the algorithmic complexity of the problem. This, then is the first fundamental aspect of the quassical architecture: it realizes the least circuit depth, whether classical or quantum or both, the least complex pathway for executing calculation.

Quantum computing models can be rewritten or reinterpreted as measurement-based systems.

The quassical lattice implies that the full power realizable from quantum computing (that is, the vertical distance from an input point in the quassical cube to an output point that is precisely below or precisely above it) can be achieved by a diagonal line that also traverses many classical states. Diagonals will have more depth (more time steps) than either vertical or horizontal lines but they also have two critical features that render them especially appealing. First, the diagonals greatly extend the utility of circuits fashioned from qubits with limited coherence time. Second, the diagonals substantially reduce the difficulties of achieving more complete connection graphs.

The 'coherence time' advantage stems from the potential for limiting the amount of time the computer's state may be represented by purely quantum data. All manifestations of the qubit (ion traps, superconducting circuits, polarized photons, even topological braids of Majorana fermions, etc.) suffer decoherence to some extent and require error correction in the form of additional overhead to achieve acceptable levels of fault tolerance.

These error correction circuits pose what can become an unbearable burden by increasing the number of physical qubits and qubit-to-qubit communication channels required to form a single, fault-tolerant "logical qubit" (tens, hundreds, or even thousands of physical qubits and connections per logical qubit up to a limit posed by the threshold theorem).

The quassical architecture may allow the design of pathways through the system that shortened the amount of time the information may remain in its quantum state and that could maintain the state of the computer in classical vectors transmuting them back into quantum vectors only for the purpose of performing a portion of the calculation that is best done in the Hilbert space of quantum computing (e.g., the quantum Fourier transform, quantum amplification, etc.). The coherence time through a quassical lattice is proportional to the slope of the diagonal—so that reducing the amount of time the computer's executive spends in quantum space necessarily entails spending more time in classical space and rotating the diagonal trajectory toward the classical limit and implying more time steps. This may or may not be advantageous from a quantum speedup point of view, but it is certainly advantageous from a decoherence point of view.

Another advantage of the quassical architecture relates to interconnections between qubits. The seriousness of the interconnection challenge has been truly recognized only recently as more engineering groups are attempting to create useful systems of many qubits.

For example, in the D-Wave designs, all the qubits are arrayed on a chip, a 2-dimensional grid in Chimera graph, which is almost, but not a planar graph. The connections are only between nearest neighbors, so that most of the qubits on a pathway between any two qubits that may want to connect can be sacrificed to fashion a quantum connection channel.

A little thought about graph theory and topology reveals that this problem is intrinsic to more or less every quantum computer design one can engineer with a non-complete graph architecture in the three-dimensional world of the embodiments herein. This may be referred to as the "graph" or "topological" constraint inherent in the architecture of quantum computers. Classical computers of course have the same problem, but it is much less acute because of the absence of quantum fragility and the facility with which classical bits may be copied and amplified when routing them through arbitrary networks of communication channels. The quassical architecture can, in principle, move some of the information through classical channels greatly mitigating the topological graph problem.

One of the more natural applications of the quassical architecture became evident in an experiment conducted to use the D-Wave machine to a deep learning problem. An experiment defines a class of pedagogical methods based on using the D-Wave machine as the 'instructor' for a deep learning network and quantum computers can be used to train neural networks more efficiently (less circuit depth) and with more accuracy and precision per training cycle than using classical techniques. Pedagogy, wherein the "professor" is quantum and the student is a classical network, is a natural and suggestive application of quassical computing.

Classical Computational Hardware Overview

FIG. 14 illustrates a block diagram of a computer system 1400 for use in an embodiment of the inventory management system. Computer system 1400 includes a communication mechanism such as a bus 1410 for passing information between other internal and external components of the computer system 1400. Information is represented as physical signals of a measurable phenomenon, typically electric voltages, but including, in other embodiments, such phenomena as magnetic, electromagnetic, pressure, chemical, molecular atomic and quantum interactions that may embody the qubits themselves. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of one or more methods described herein.

A sequence of binary digits constitutes digital data that is used to represent a number or code for a character. A bus 1410 includes many parallel conductors of information so that information is transferred quickly among devices coupled to the bus 1410. One or more processors 1402 for processing information are coupled with the bus 1410. A processor 1402 performs a set of operations on information. The set of operations include bringing information in from the bus 1410 and placing information on the bus 1410. The set of operations also typically include comparing two or more units of information, shifting positions of units of information, and combining two or more units of information, such as by addition or multiplication. A sequence of operations to be executed by the processor 1402 constitutes computer instructions.

Computer system 1400 also includes a memory 1404 coupled to bus 1410. The memory 1404, such as a random access memory (RAM) or other dynamic storage device, stores information including computer instructions. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of computer instructions. The computer system 1400 also includes a read only memory (ROM) 1406, non-volatile persistent storage device or static storage device coupled to the bus 1410 for storing static information, including instructions, that is not changed by the computer system 1400. Also coupled to bus 1410 is a non-volatile (persistent) storage device 1408, such as a magnetic disk or optical disk, for storing information, including instructions, that persists even when the computer system 1400 is turned off or otherwise loses power.

Information, including instructions, is provided to the bus 1410 for use by the processor from an external input device 1412, such as a keyboard containing alphanumeric keys operated by a human user, or a sensor. A sensor detects conditions in its vicinity and transforms those detections into signals compatible with the signals used to represent information in computer system 1400. Other external devices coupled to bus 1410, used primarily for interacting with humans, include a display device 1414, such as a cathode ray tube (CRT) or a liquid crystal display (LCD), for presenting images, and a pointing device 1416, such as a mouse or a trackball or cursor direction keys, for controlling a position of a small cursor image presented on the display 1414 and issuing commands associated with graphical elements presented on the display 1414.

In the illustrated embodiment, special purpose hardware, such as an application specific integrated circuit (IC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface (not shown) coupled to bus 1410. A communication interface may provide a two-way communication coupling to a variety of external devices that operate with their own processors, such as printers, scanners and external disks. In general, the coupling is with a network link (not shown) that is connected to a local network, for example, to which a variety of external devices with their own processors are connected. For example, a communication interface may be a parallel port or a serial port or a universal serial bus (USB) port on a personal computer. In some embodiments, a communications interface is an integrated services digital network (ISDN) card or a digital subscriber line (DSL) card or a telephone modem that provides an information communication connection to a corresponding type of telephone line. In some embodiments, a communication interface is a cable modem that converts signals on bus 1410 into signals for a communication connection over a coaxial cable or into optical signals for a communication connection over a fiber optic cable. As another example, a communications interface may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface sends and receives electrical, acoustic or electromagnetic signals, including infrared and optical signals, that carry information streams, such as digital data.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1402, except for carrier waves and other signals.

Logic encoded in one or more tangible and non-transitory media includes one or both of processor instructions on a computer-readable storage media and special purpose hardware, such as ASIC 1420.

The invention is related to the use of computer system 1400 for implementing the classical computing system, the control subsystem and/or digital controllers and the techniques described herein. According to one embodiment of the invention, those techniques are performed by computer system 1400 in response to processor 1402 executing one or more sequences of one or more instructions contained in memory 1404. Such instructions, also called software and program code, may be read into memory 1404 from another computer-readable medium such as storage device 1408. Execution of the sequences of instructions contained in memory 1404 causes processor 1402 to perform the method steps described herein. In alternative embodiments, hardware, such as application specific integrated circuit 1420, may be used in place of or in combination with software to implement the invention. Thus, embodiments of the invention are not limited to any specific combination of hardware and software.

Various forms of computer readable media may be involved in carrying one or more sequence of instructions or data or both to processor 1402 for execution. For example, instructions and data may initially be carried on a magnetic disk of a remote computer. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red a carrier wave serving as the network link. An infrared detector serving as communications interface may receive the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

Computer-readable media means any media that can be accessed by a computing device. By way of example, and not limitation, computer-readable media may comprise computer storage media and communication media.

Computer storage media means any medium that can be used to store computer-readable information in tangible and non-transitory computer storage media. By way of example, and not limitation, computer storage media may include RAM, ROM, EEPROM, flash memory or other memory technology, CD-ROM, DVD or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, radio frequency (RF), infrared, acoustic or other types of signals.

Computer program code for carrying out operations described above may be written in a variety of programming languages, including but not limited to a high-level programming language, such as, without limitation, C, C++, C#, and Objective-C. Other suitable languages may include Java™, Javascript, Pascal, Object Pascal, Python™, Delphi™ Visual Basic, etc. including new languages just now being released by Rigetti Computing, IBM, Microsoft, and a host of other private vendors. In addition, computer program code for carrying out operations of embodiments described herein may also be written in other programming languages, such as, but not limited to, interpreted languages. The program code may include hardware description language (HDL) or very high speed integrated circuit (VHSIC) hardware description language, such as for firmware programming. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

REFERENCES

The references disclosed herein are hereby expressly incorporated in their entireties by reference.

H. B. Axelsen, R. Gluck. On reversible Turing machines and their function universality, Acta Informatica 53 (2016), 509-543. (Class of reversible Turing machines (machines whose computations can be fully undone) has a universal reversible Turing machine.)

D. Mermin. Quantum Computer Science, Cambridge University Press, Cambridge, 2007. (Class of quantum gate-based machines.)

M. Stern, G. Catelani, Y. Kubo, C. Grezes, A. Bienfait, D. Vion, D. Esteve, P. Bertet. Flux qubits with long coherence times for hybrid quantum circuits, Phys. Rev. Lett. 113, 123601, September 2014. (Symptomatically, a form of quasicality can produce qubits with long coherence times.)

B. Tamir, E. Cohen. Notes on Adiabatic Quantum Computers, arXiv:1512.07617, December 2016. (Some results suggest that the Adiabatic Quantum Computing model is more robust against decoherence than the Quantum Gate model.)

W. Lechner, P. Hauke, P. Zoller. A quantum annealing architecture with all-to-all connectivity from local interactions, Science Advance, 1,9 (2015), (Theoretical proposal for quantum architectures using all-to-all connectivity.)

S. Puri, C. K. Andersen, A. L. and Grimsmo, A. Blais. Quantum annealing with all-to-all connected nonlinear oscillators, Nature Communications, DOI: 10.1038/ncomms15785, Jun. 8, 2017. (Theoretical proposal for quantum architectures using all-to-all connectivity.)

C. McGeoch. Adiabatic Quantum Computation and Quantum Annealing. Theory and Practice, Morgan & Claypool Publishers, 2014. (Information about this approach to quantum computing.)

Int. J. Theor. Phys. 21 (1982), 467-488.

M. Nielsen. The Solovay-Kitaev Algorithm, www.michaelnielsen.org/blog/the-solovay-kitaev-algorithm, May 7, 2005. (The set of possible quantum gates forms a continuum, and it's not necessarily possible to use one gate set to simulate another exactly. Instead, some approximation may be necessary.)

C. S. Calude, E. Calude, M. J. Dinneen. Adiabatic Quantum Computing Challenges, ACM SIGACT News, 46,1 (2015), 40-61. (Quantum analog-discrete duality.)

R. Landauer. Irreversibility and heat generation in the computing process, IBM Journal of Research and Development 5 (1961), 183-191. (Techniques to make classical computing can be made fully reversible.)

C. H. Bennett. Logical reversibility of computation, IBM Journal of Research and Development 17 (1973), 525-532. (Techniques to make classical computing can be made fully reversible.)

Microsoft Station Q scientist Dr R. Lutchyn. Topological Quantum Computing Majorana Fermions, www.goo.gl/Nw5mRH. Sep. 11, 2014, (It is suggested that "conventional quantum computing circuits" to perform calculations while topological qubits would be employed to store quantum information.)

D. Aharonov, W. van Dam, J. Kempe, Z. Landau, S. Lloyd, O. Regev. Adiabatic quantum computation is equivalent to standard quantum computation, SIAM J. Comput., 37(1) (2007), 166-194.

M. Lanzagorta, J. K. Uhlmann. Hybrid quantum-classical computing with applications to computer graphics, ACM SIGGRAPH 2005 Courses, 2005.

R. Jozsa. An introduction to measurement based quantum computation, arXiv:quant-ph/0508124, August 2015. (Examples of measurement based QC: "one way quantum computing", and "teleportation quantum computing".)

T. Abash, D. A. Lidar. Decoherence in adiabatic quantum computation, arXiv:1503.08767, June 2015.

S. H. Adachi, M. P. Henderson. Application of Quantum Annealing to Training of Deep Neural Networks, arXiv: 1510.06356, October 2015.

A. W. Harrow, A. Hassidim, S. Lloyd. Quantum Algorithm for Linear Systems of Equations, arXiv:0811.3171v3, Sep. 30, 2009.

P. Rebentrost, M. Mohseni, S. L. Lloyd. Quantum Support Vector Machine for Big Feature and Big Data Classification, arXiv:1307.0471v2, Jul. 10, 2013.

S. L. Lloyd, M. Mohseni, P. Rebentrost. Quantum Algorithms for Supervised and Unsupervised Machine Learning, arXiv:1307.0411v2, Nov. 4, 2013.

D. W. Berry. Higher-order Quantum Algorithm for Solving Linear Differential Equations. arXiv:1010.2745v2, Jan. 28, 2014.

A. Montanaro. Quantum algorithms: an overview, copyright 2016, University of New South Wales/Macmillan Publishers Limited, January 2016.

B. D. Clader, B. C. Jacobs, and C. R. Sprouse. Preconditioned Quantum Linear System Algorithm, Phys. Rev. Lett. 110, 250504—Published 18 Jun. 2013; Erratum Phys. Rev. Lett. 111, 049903 (2013), www.journals.aps.org/prl/abstr-act/10.1103/PhysRevLett.110.250504.

J. Thomas. Synopsis: Solving for X and Y, Jun. 6, 2013, www.physics.aps.org/synopsis-for/10.1103/PhysRevLett.110.230501.

S. Barz, I. Kassal, M. Ringbauer, Y. Ole Lipp, B. Dakic', A. Aspuru-Guzik, P. Walther. A two-qubit photonic quantum processor and its application to solving systems of linear equations, Scientific Reports, 4:6115, DOI: 10.1038/srep06115, August 14.

J. Preskill, Chapter 1, Introduction and Overview, pg. 1-30, www.theory.caltech.edu/people/preskill/ph229.

We claim:

1. A system comprising:
a classical computing subsystem configured to perform a set of classical operations in a configurable three-dimensional (3D) classical space unit comprising and using one or more of classical computing gates arranged in decomposed stopping points along a consecutive sequence of stopping points of sub-cells of the 3D classical space unit, along a classical trajectory vector selected to have a shortest path through the 3D classical space unit between two points of the 3D classical space unit;
a quantum computing subsystem configured to perform a set of quantum operations in a configurable 3D quantum space unit comprising and using one or more of quantum computing gates arranged in decomposed stopping points along a consecutive sequence of stopping points of sub-cells of the 3D quantum space unit, along a quantum trajectory vector selected to have a shortest path through the 3D quantum space unit between two points of the 3D quantum space unit; and
a control subsystem configured to receive a problem decomposed into classical subproblems and quantum subproblems, decompose the received classical subproblems into the decomposed stopping points in the 3D classical space unit and the received quantum subproblems into the decomposed stopping points in the 3D quantum space unit, provide classical computing instructions and state information to the classical computing subsystem to perform the set of classical operations and provide quantum computing instructions and the state information to the quantum computing subsystem to perform the set of quantum operations such that the problem is solved using a trajectory vector having a shortest path for one of a received classical subproblem and a received quantum subproblem at a time.

2. The system according to claim 1, wherein the quantum trajectory vector being selected to have the shortest path through the 3D quantum space unit to eliminate error correction redundant qubits.

3. The system according to claim 1, further comprising a plurality of 3D classical space units and a plurality of 3D quantum space unit arranged in a quassical space configured as a quassical lattice wherein the subproblems are arranged along a diagonal path through the quassical lattice from a starting point to an end point wherein the 3D classical space units alternate with 3D quantum space units along the diagonal path.

4. The system according to claim 3, wherein the control subsystem being configured to swap one 3D quantum space unit in the diagonal path with a first set of quantum circuits with another 3D quantum space unit with a second set of quantum circuits in the quassical lattice wherein the quantum trajectory vector selected to have the shortest path is based on qubits of the second set of quantum circuits.

5. The system according to claim 1, wherein the control subsystem configured to determine a plurality of candidate classical trajectory vectors and evaluate and rank the plurality of candidate classical trajectory vectors based on computational length and complexity wherein the classical trajectory vector with the shortest path is selected to have the least one of a least computational length and computational complexity of the ranked candidate classical trajectory vectors.

6. The system according to claim 5, wherein the control subsystem being configured to swap the sub-cells within the 3D classical space unit to form the selected classical trajectory vector with the shortest path with other sub-cells within the 3D classical space unit to form a diagonal trajectory vector.

7. The system according to claim 1, wherein the control subsystem being configured to determine whether the received problem is for a respective one mode of operation selected from a trivial quassical mode, a profound quassical mode and a profound substantive quassical mode wherein the control subsystem generates instructions for the classical computing subsystem and the quantum computing subsystem based on the respective one mode.

8. A method comprising:
performing, by a classical computing subsystem, a set of classical operations in a configurable three-dimensional (3D) classical space unit comprising and using one or more of classical computing gates arranged in decomposed stopping points along a consecutive sequence of stopping points of sub-cells, in the 3D classical space unit, along a classical trajectory vector selected to have a shortest path through the 3D classical space unit between two points of the 3D classical space unit;
performing, by a quantum computing subsystem, a set of quantum operations in a configurable 3D quantum space unit comprising and using one or more of quantum computing gates arranged in decomposed stopping points along a consecutive sequence of stopping points of sub-cells of the 3D quantum space unit, along a quantum trajectory vector selected to have a shortest path through the 3D quantum space unit between two points of the 3D quantum space unit;
receiving, by a control subsystem, a problem decomposed into classical subproblems and quantum subproblems;
decomposing, by the control subsystem, the received classical subproblems into the decomposed stopping points in the 3D classical space unit and the received quantum subproblems into the decomposed stopping points in the 3D quantum space unit; and
providing, by the control subsystem, classical computing instructions and state information to the classical computing subsystem to perform the set of classical operations and quantum computing instructions and the state information to the quantum computing subsystem to perform the set of quantum operations such that the problem is solved using a trajectory vector having a shortest path for one of a received classical subproblem and a received quantum subproblem at a time.

9. The method according to claim 8, wherein the selecting of the quantum trajectory vector includes selecting the quantum trajectory vector to have the shortest path through the 3D quantum space unit to eliminate error correction redundant qubits.

10. The method according to claim 8, further comprising, by the control subsystem, arranging a plurality of 3D classical space units and a plurality of 3D quantum space unit in a quassical space configured as a quassical lattice; and
arranging the subproblems along a diagonal path through the quassical lattice from a starting point to an end point wherein the 3D classical space units alternate with 3D quantum space units along the diagonal path.

11. The method according to claim 10, further comprising, by the control subsystem, swapping one 3D quantum space unit in the diagonal path with a first set of quantum circuits with another 3D quantum space unit with a second set of quantum circuits in the quassical lattice wherein the quantum trajectory vector selected to have the shortest path is based on qubits of the second set of quantum circuits.

12. The method according to claim 8, further comprising, by the control subsystem:
determining a plurality of candidate classical trajectory vectors; and
evaluating and ranking the plurality of candidate classical trajectory vectors based on computational length and complexity wherein the classical trajectory vector with the shortest path is selected to have the least one of a least computational length and computational complexity of the ranked candidate classical trajectory vectors.

13. The method according to claim 12, further comprising, by the control subsystem, swapping the sub-cells within the 3D classical space unit to form the selected classical trajectory vector with the shortest path with other sub-cells within the 3D classical space unit to form a diagonal trajectory vector.

14. The method according to claim 8, further comprising, by the control subsystem, determining whether the received problem is for a respective one mode of operation selected from a trivial quassical mode, a profound quassical mode and a profound substantive quassical mode; and
generating instructions for the classical computing subsystem and the quantum computing subsystem based on the respective one mode.

15. Non-transitory, tangible computer readable media having instructions stored therein which when executed by at least one processor, causes the at least one processor to:
perform, by a classical computing subsystem, a set of classical operations in a configurable three-dimensional (3D) classical space unit comprising and using one or more of classical computing gates arranged in decomposed stopping points along a consecutive sequence of stopping points of sub-cells of the 3D classical space unit, along a classical trajectory vector selected to have a shortest path through the 3D classical space unit between two points of the 3D classical space unit;
perform, by a quantum computing subsystem, a set of quantum operations in a configurable 3D quantum space unit comprising and using one or more of quantum computing gates arranged in decomposed stopping points along a consecutive sequence of stopping points of sub-cells of the 3D quantum space unit, along a quantum trajectory vector selected to have a shortest path through the 3D quantum space unit between two points of the 3D quantum space unit;
receive, by a control subsystem, a problem decomposed into classical subproblems and quantum subproblems;
decompose, by the control subsystem, the received classical subproblems into the decomposed stopping points in the 3D classical space unit and the received quantum subproblems into the decomposed stopping points in the 3D quantum space unit; and provide, by the control subsystem, classical computing instructions and state information to the classical computing subsystem to perform the set of classical operations and quantum computing instructions and the state information to the quantum computing subsystem to perform the set of quantum operations such that the problem is solved using a trajectory vector having a shortest path for one of a received classical subproblem and a received quantum subproblem at a time.

16. The computer readable media according to claim 15, wherein the quantum trajectory vector is selected to have the shortest path through the 3D quantum space unit to eliminate error correction redundant qubits.

17. The computer readable media according to claim 15, further comprising instructions which when executed by the at least one processor to cause the control subsystem to:
 arrange a plurality of 3D classical space units and a plurality of 3D quantum space unit in a quassical space configured as a quassical lattice; and
 arrange the subproblems along a diagonal path through the quassical lattice from a starting point to an end point wherein the 3D classical space units alternate with 3D quantum space units along the diagonal path.

18. The computer readable media according to claim 17, further comprising instructions which when executed by the at least one processor to cause the control subsystem to:
 swap one 3D quantum space unit in the diagonal path with a first set of quantum circuits with another 3D quantum space unit with a second set of quantum circuits in the quassical lattice wherein the quantum trajectory vector selected to have the shortest path is based on qubits of the second set of quantum circuits.

19. The computer readable media according to claim 15, further comprising instructions which when executed by the at least one processor to cause the control subsystem to:
 determine a plurality of candidate classical trajectory vectors; and
 evaluate and rank the plurality of candidate classical trajectory vectors based on computational length and complexity wherein the classical trajectory vector with the shortest path is selected to have the least one of a least computational length and computational complexity of the ranked candidate classical trajectory vectors.

20. The computer readable media according to claim 19, further comprising instructions which when executed by the at least one processor to cause the control subsystem to:
 swap the sub-cells within the 3D classical space unit to form the selected classical trajectory vector with the shortest path with other sub-cells within the 3D classical space unit to form a diagonal trajectory vector.

* * * * *